(12) United States Patent
Miyazaki

(10) Patent No.: US 10,678,212 B2
(45) Date of Patent: Jun. 9, 2020

(54) NUMERICAL CONTROL SYSTEM

(71) Applicant: FANUC CORPORATION, Minamitsuru-gun, Yamanashi (JP)

(72) Inventor: Takeshi Miyazaki, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 0 days.

(21) Appl. No.: 16/298,284

(22) Filed: Mar. 11, 2019

(65) Prior Publication Data
US 2019/0317474 A1 Oct. 17, 2019

(30) Foreign Application Priority Data

Apr. 13, 2018 (JP) .................. 2018-077770

(51) Int. Cl.
| | |
|---|---|
| *G05B 19/4063* | (2006.01) |
| *G05B 19/18* | (2006.01) |
| *G05B 19/4155* | (2006.01) |
| *G05B 19/401* | (2006.01) |
| *G05B 19/19* | (2006.01) |

(52) U.S. Cl.
CPC ....... *G05B 19/4063* (2013.01); *G05B 19/182* (2013.01); *G05B 19/19* (2013.01); *G05B 19/401* (2013.01); *G05B 19/4155* (2013.01); *G05B 2219/31263* (2013.01); *G05B 2219/35158* (2013.01); *G05B 2219/35252* (2013.01);
(Continued)

(58) Field of Classification Search
CPC .... G05B 19/182; G05B 19/19; G05B 19/401; G05B 19/4063; G05B 19/4155; G05B 2219/31263; G05B 2119/35158; G05B 2219/35252; G05B 2219/37559; G05B 2219/50064
See application file for complete search history.

(56) References Cited

U.S. PATENT DOCUMENTS 4,767,972 A * 8/1988 Hirai .................. G05B 19/4063
318/565
5,248,924 A * 9/1993 Niwa ................... G05B 19/408
318/569
(Continued)

FOREIGN PATENT DOCUMENTS

JP 2014-63434 4/2014

*Primary Examiner* — Jennifer L Norton
(74) *Attorney, Agent, or Firm* — Wenderoth, Lind & Ponack, L.L.P.

(57) ABSTRACT

A numerical control system includes an image processing device that performs image processing on images captured by an imaging device and a numerical controller. The numerical controller includes a program analysis unit and a storage unit that stores operation control information of the machine, the imaging device, and the image processing device in a format that can be read and written by the program analysis unit. The numerical control system includes a conversion unit that converts commands or the operation control information stored in the storage unit to image processing input items which are setting values of a format that can be recognized by the imaging device and the image processing device and converts image processing output items which are the results of the image processing from the image processing device to operation control information of a format that can be recognized by the program analysis unit.

4 Claims, 27 Drawing Sheets

(52) U.S. Cl.
CPC .............. *G05B 2219/37559* (2013.01); *G05B 2219/50064* (2013.01)

(56) References Cited

U.S. PATENT DOCUMENTS

| | | | | |
|---|---|---|---|---|
| 5,986,425 | A * | 11/1999 | Onishi | G05B 19/19 318/567 |
| 9,760,261 | B2 * | 9/2017 | Yahaba | G06F 3/0488 |
| 9,811,759 | B2 * | 11/2017 | Matsubara | G06K 9/00 |
| 2005/0209712 | A1 * | 9/2005 | Sagasaki | G05B 19/4093 700/28 |
| 2016/0291583 | A1 * | 10/2016 | Satake | G05B 19/4068 |
| 2018/0210420 | A1 * | 7/2018 | Kaneko | G05B 19/4068 |

* cited by examiner

FIG.3

NC PROGRAM (DURING IMAGING AND IMAGE PROCESSING)

| | |
|---|---|
| O1000 | |
| #100=1; | DESIGNATE FIRST VISION SENSOR |
| #101=123; | DESIGNATE IMAGE PROCESSING PROGRAM 123 |
| G810; | PERFORM IMAGING AND ACTIVATE IMAGE PROCESSING WITH DESIGNATED CONTENT |
| G00X#201 | USE EXECUTION RESULTS (POSITIONING POSITIONS) |
| | |
| #100=2; | DESIGNATE SECOND VISION SENSOR |
| #101=234; | DESIGNATE IMAGE PROCESSING PROGRAM 234 |
| G810; | PERFORM IMAGING AND ACTIVATE IMAGE PROCESSING WITH DESIGNATED CONTENT |
| G00X#201 | USE EXECUTION RESULTS (POSITIONING POSITIONS) |
| | |
| M30; | |

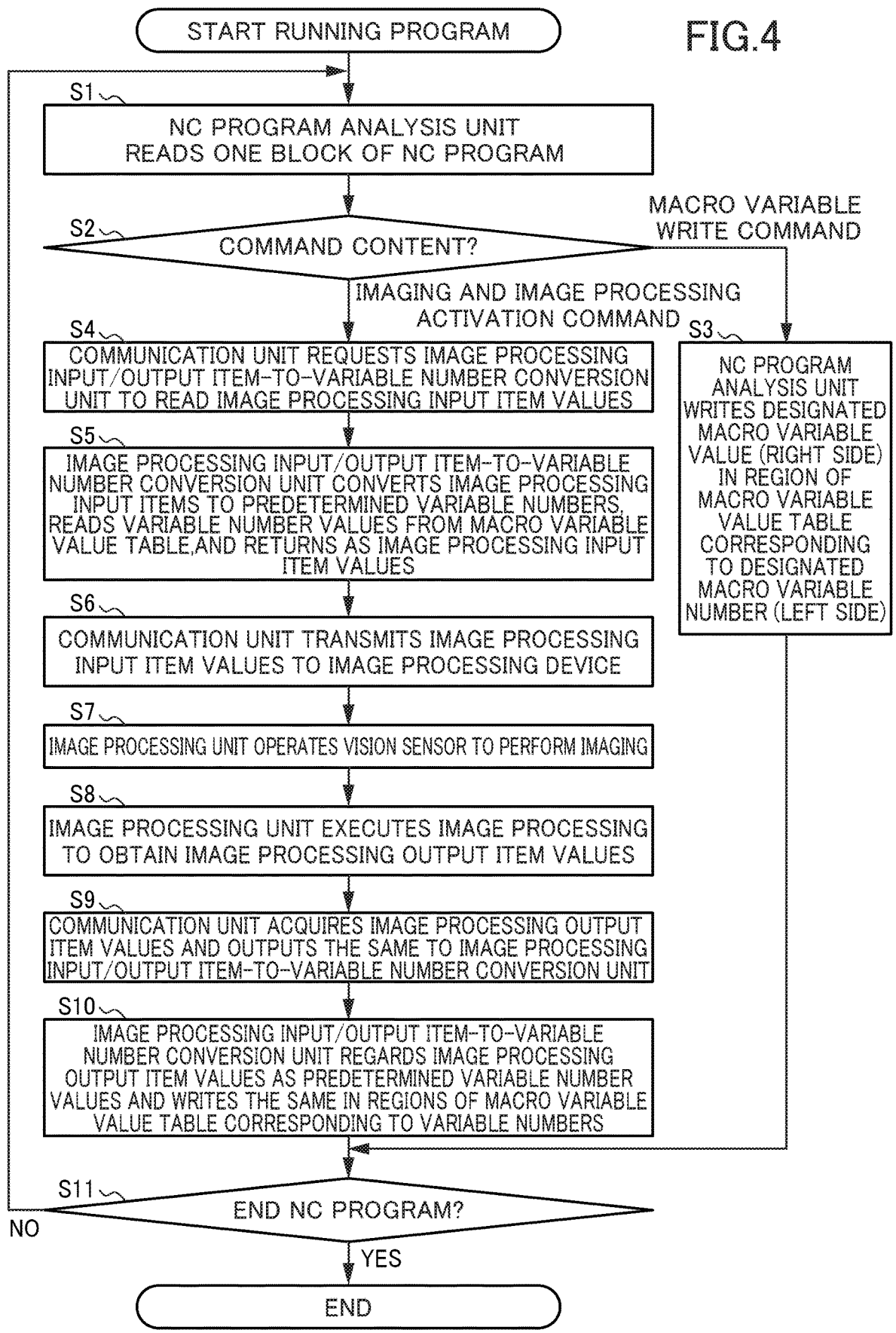

NC PROGRAM (DURING IMAGING AND IMAGE PROCESSING)

```
O1000
#100=1;              DESIGNATE FIRST VISION SENSOR
#101=123;            DESIGNATE IMAGE PROCESSING PROGRAM 123
G810;                PERFORM IMAGING AND ACTIVATE IMAGE
                     PROCESSING WITH DESIGNATED CONTENT
:
:
```

MACRO VARIABLE VALUE TABLE

| #201 | COORDINATE VALUE OF UPPERMOST SURFACE OF CASTING |
|---|---|

FIG. 7

NC PROGRAM (DURING MACHINING)

```
O1000
#100=1;                    DESIGNATE FIRST VISION SENSOR
#101=123;                  DESIGNATE IMAGE PROCESSING PROGRAM 123
G810;                      PERFORM IMAGING AND ACTIVATE IMAGE
                           PROCESSING WITH DESIGNATED CONTENT
                           (↓ USE IMAGE PROCESSING RESULTS)
IF[#201>10.0][             CHECK HEIGHT OF CASTING
G01X0.0Z10.0;
G01X10.0;
G01Y10.0;
G01X0.0;
G01Y0.0;]
IF[#201>9.0][
G01X0.0Z9.0;
G01X10.0;
G01Y10.0;
G01X0.0;
G01Y0.0;]
IF[#201>8.0][
G01X0.0Z8.0;
G01X10.0;
G01Y10.0;
G01X0.0;
G01Y0.0;]
G01X0.0Z7.0;
G01X10.0;
G01Y10.0;
G01X0.0;
G01Y0.0;
M30;
```

WHEN #201 (COORDINATE VALUE OF UPPERMOST SURFACE OF CASTING) IS SMALL, BLOCKS FOR MACHINING HIGHER PORTIONS ARE NOT EXECUTED

FIG. 8A

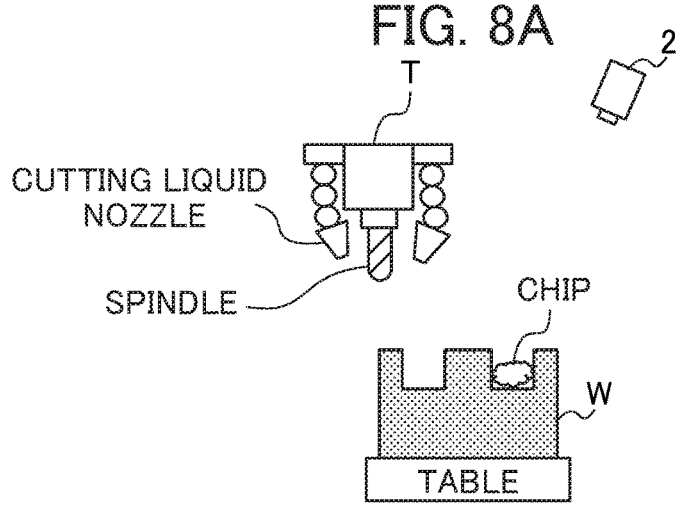

FIG. 8B

NC PROGRAM (DURING IMAGING AND IMAGE PROCESSING)

```
O1000
#100=1;        DESIGNATE FIRST VISION SENSOR
#101=123;      DESIGNATE IMAGE PROCESSING PROGRAM 123
G810;          PERFORM IMAGING AND ACTIVATE IMAGE
               PROCESSING WITH DESIGNATED CONTENT
:
:
```

FIG. 8C

MACRO VARIABLE VALUE TABLE

| #201 | FLAG INDICATING CERTAIN AMOUNT OF CHIP HAS GATHERED |
|---|---|
| #202 | CHIP DEPOSITION REGION (POSITIONS OF POINTS) X |
| #203 | CHIP DEPOSITION REGION (POSITIONS OF POINTS) Y |

FIG. 9A

NC PROGRAM (DURING MACHINING)

```
O1000
#100=1;              DESIGNATE FIRST VISION SENSOR
#101=123;            DESIGNATE IMAGE PROCESSING PROGRAM 123
G810;                PERFORM IMAGING AND ACTIVATE IMAGE
                     PROCESSING WITH DESIGNATED CONTENT
                     (↓USE IMAGE PROCESSING RESULTS)
IF[#201==1.0] [      CHECK WHETHER CERTAIN AMOUNT OF CHIP HAS GATHERED
   G00X#202Y#203;    POSITIONING AT CHIP DEPOSITION POSITION
   M08;              START JETTING CUTTING LIQUID
   M09; ]            STOP JETTING CUTTING LIQUID

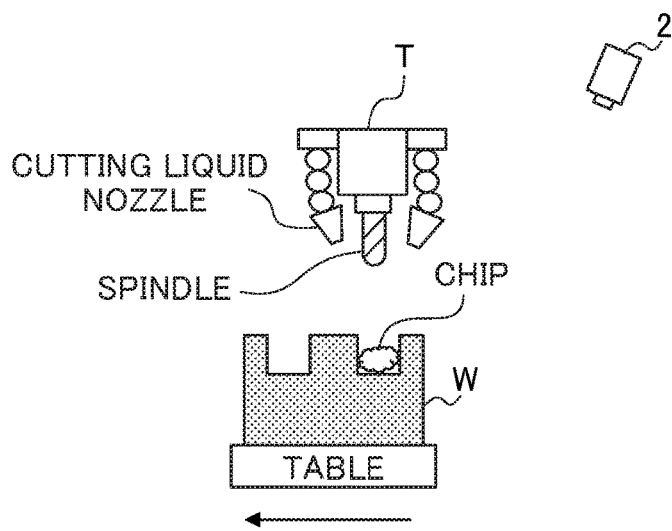

NC PROGRAM (DURING MACHINING)

| | |
|---|---|
| G10.8 I1.0 ; | DESIGNATE TOLERANCE AMOUNT OF 1.0 |
| ↓ | |
| MACHINING | UNNECESSARY INNER CORNERING |
| ↓ | |
| G10.8 I0.5 ; | REDESIGNATE SMALLER VALUE BY UNNECESSARY INNER CORNERING AMOUNT |

MANUAL REDESIGNATING INCURS TIME AND EFFORT

FIG. 11A
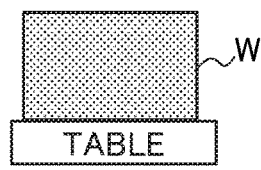
FIG. 11B
NC PROGRAM (DURING IMAGING AND IMAGE PROCESSING)
```
O1000
#100=1;         DESIGNATE FIRST VISION SENSOR
#101=123;       DESIGNATE IMAGE PROCESSING PROGRAM 123
G810;           PERFORM IMAGING AND ACTIVATE IMAGE
                PROCESSING WITH DESIGNATED CONTENT
:
:
```
FIG. 11C
MACRO VARIABLE VALUE TABLE
| #201 | DISTANCE OF PORTION IN WHICH ACTUAL SHAPE MOST GREATLY DEVIATES FROM DESIRED SHAPE |
|---|---|

FIG. 12

NC PROGRAM (DURING MACHINING)

| | |
|---|---|
| O1000 | |
| G10.8 I#500 ; | DESIGNATE TOLERANCE AMOUNT STORED IN ADVANCE IN #500 |
| : | |
| : | MACHINING PROGRAM |
| : | |
| #100=1; | DESIGNATE FIRST VISION SENSOR |
| #101=123; | DESIGNATE IMAGE PROCESSING PROGRAM 123 |
| G810; | PERFORM IMAGING AND ACTIVATE IMAGE PROCESSING WITH DESIGNATED CONTENT (↓ USE IMAGE PROCESSING RESULTS) |
| #500=#500-#201; | CORRECT VALUE OF #500 BY DEVIATION AMOUNT |
| M30; | |

NC PROGRAM (DURING IMAGING AND IMAGE PROCESSING)

```
O1000
#100=1;           DESIGNATE FIRST VISION SENSOR
#101=123;         DESIGNATE IMAGE PROCESSING PROGRAM 123
G810;             PERFORM IMAGING AND ACTIVATE IMAGE
                  PROCESSING WITH DESIGNATED CONTENT
:
:
```

MACRO VARIABLE VALUE TABLE

| #201 | TOOL LENGTH |
|------|-------------|

FIG. 14A

NC PROGRAM (DURING MACHINING)

| | |
|---|---|
| O1000 | |
| #100=1; | DESIGNATE FIRST VISION SENSOR |
| #101=123; | DESIGNATE IMAGE PROCESSING PROGRAM 123 |
| G810; | PERFORM IMAGING AND ACTIVATE IMAGE PROCESSING WITH DESIGNATED CONTENT (↓ USE IMAGE PROCESSING RESULTS) |
| IF[ABS[#201-TOOL_LEN[1]]>1.0] { | CHECK WHETHER MEASURED TOOL LENGTH DIFFERS GREATLY FROM SETTING VALUE |
|    M6T3; } | REPLACE TOOL WITH ANOTHER TOOL OF THE SAME TYPE |
| : : M30; | MACHINING PROGRAM |

FIG. 14B

NC PROGRAM (DURING MACHINING)

| | |
|---|---|
| O1000 : : | MACHINING PROGRAM |
| #100=1; | DESIGNATE FIRST VISION SENSOR |
| #101=123; | DESIGNATE IMAGE PROCESSING PROGRAM 123 |
| G810; | PERFORM IMAGING AND ACTIVATE IMAGE PROCESSING WITH DESIGNATED CONTENT (↓ USE IMAGE PROCESSING RESULTS) |
| IF[ABS[#201-TOOL_LEN[1]]>1.0] { | CHECK WHETHER MEASURED TOOL LENGTH DIFFERS GREATLY FROM SETTING VALUE |
|    ALARM=1(ALARM MESSAGE); } | ISSUE ALARM AND STOP MACHINING |
| M30; | |

FIG. 14C

NC PROGRAM (DURING MACHINING)

```
O1000
#100=1;                DESIGNATE FIRST VISION SENSOR
#101=123;              DESIGNATE IMAGE PROCESSING PROGRAM 123
G810;                  PERFORM IMAGING AND ACTIVATE IMAGE
                       PROCESSING WITH DESIGNATED CONTENT
                       ( ↓ USE IMAGE PROCESSING RESULTS)
TOOL_LEN[1]=#201;      OVERWRITE TO "VALUE SET IN ADVANCE IN
                       NUMERICAL CONTROLLER"
M30;
```

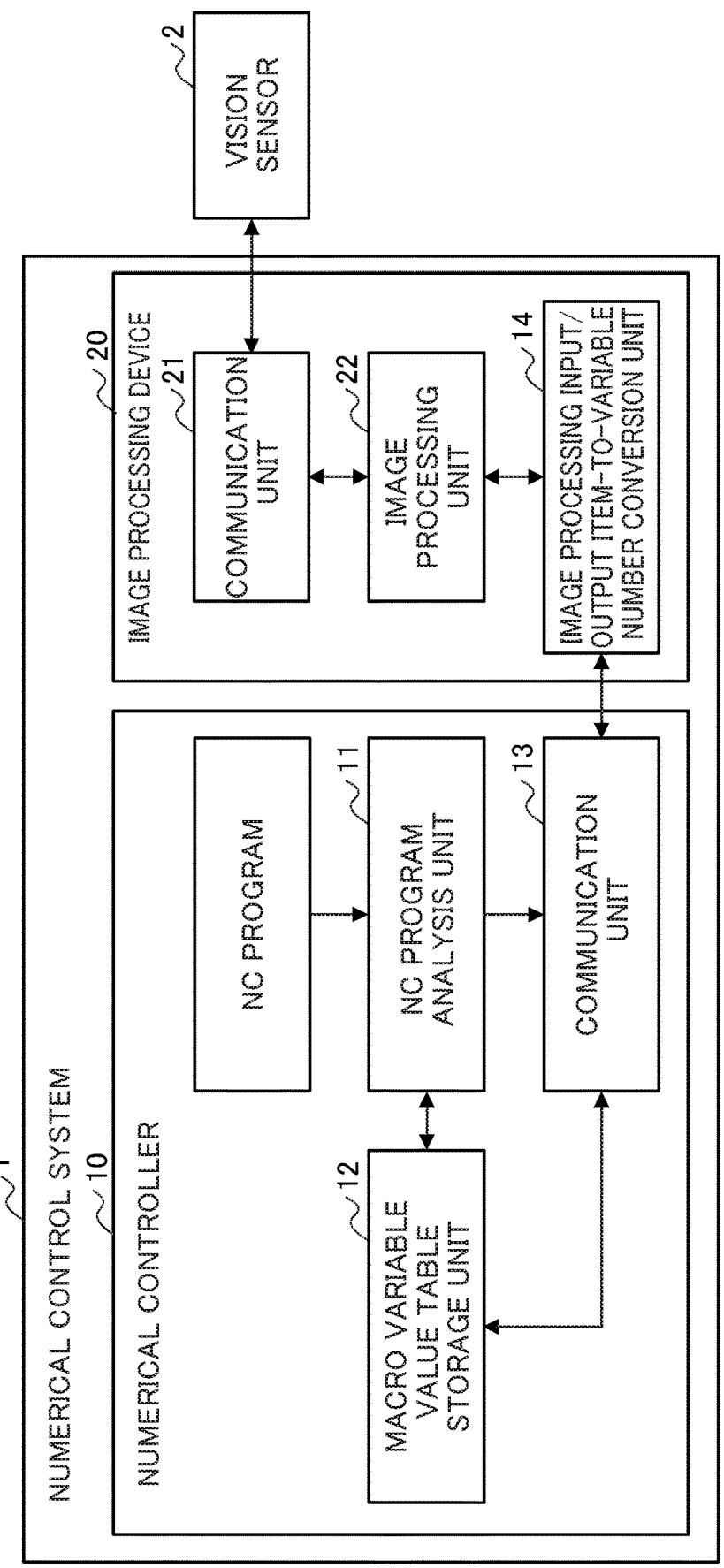

LADDER PROGRAM (DURING IMAGING AND IMAGE PROCESSING)

SIGNAL REGION

| R0200 | FLAG INDICATING CERTAIN AMOUNT OF CHIP HAS GATHERED |
|---|---|
| R0210 | CHIP DEPOSITION REGION (POSITIONS OF POINTS) XL |
| R0220 | CHIP DEPOSITION REGION (POSITIONS OF POINTS) YL |

FIG. 23

NC PROGRAM (DURING IMAGING AND IMAGE PROCESSING)

```
O1000
G810P1Q123; DESIGNATE FIRST VISION SENSOR
             DESIGNATE IMAGE PROCESSING PROGRAM 123
             PERFORM IMAGING AND ACTIVATE IMAGE
             PROCESSING WITH DESIGNATED CONTENT
G00X#201     USE EXECUTION RESULTS (POSITIONING POSITIONS)
M30;
```

```
#201 : EXECUTION RESULTS (COORDINATE VALUES
       OF MEASUREMENT POINTS)
G810 : IMAGE PROCESSING ACTIVATION COMMAND
  P : VISION SENSOR NUMBER
  Q : IMAGE PROCESSING PROGRAM NUMBER
```

FIG. 25

NC PROGRAM (DURING IMAGING AND IMAGE PROCESSING)

| |
|---|
| O1000 |
| #101=123; |
| G810; |
| |
| G00X#201 |
| |
| M30; |

DESIGNATE IMAGE PROCESSING PROGRAM 123
PERFORM IMAGING AND ACTIVATE IMAGE PROCESSING WITH DESIGNATED CONTENT
USE EXECUTION RESULTS (POSITIONING POSITIONS)

| |
|---|
| #101 : DESIGNATE IMAGE PROCESSING PROGRAM NUMBER |
| #201 : EXECUTION RESULTS (COORDINATE VALUES OF MEASUREMENT POINTS) |
| G810 : IMAGE PROCESSING ACTIVATION COMMAND |

NUMERICAL CONTROL SYSTEM

This application is based on and claims the benefit of priority from Japanese Patent Application No. 2018-077770, filed on 13 Apr. 2018, the content of which is incorporated herein by reference.

BACKGROUND OF THE INVENTION

Field of the Invention

The present invention relates to a numerical control system that controls machine tools, industrial machines, industrial robots, or the like.

Related Art

In recent years, images captured by a video camera attached to a machining work in a machine tool, a peripheral machine, and the like are used for remote monitoring of a machining work and a peripheral device, quality control based on recording of images and videos of a machined work. Patent Document 1 discloses a numerical controller having a function of operating a video camera connected to a machine tool. When operating the video camera, the numerical controller needs to designate setting values (for example, the selection of a video camera, a resolution, and a frame number) necessary for operating the video camera. Patent Document 1 discloses a technology of designating respective setting values of a video camera using an argument of a G-code command.

Patent Document 1: Japanese Unexamined Patent Application, Publication No. 2014-63434

SUMMARY OF THE INVENTION

If imaging and image processing results (for example, OK/NG, measured lengths, areas) of a tool or a work of a machine captured by an imaging device can be reflected in an NC program, it may be convenient since the NC program can be changed according to the imaging and image processing results. However, G-code commands cannot receive the imaging and image processing results, and the imaging and image processing results cannot be reflected in an NC program.

An object of the present invention is to provide a numerical control system capable of reflecting imaging results of a machine or a work captured by an imaging device in a program.

(1) A numerical control system (for example, a numerical control system 1, 1B to be described later) according to the present invention is a numerical control system that controls a machine that performs predetermined processing on a work (for example, a work W to be described later), including: an image processing device (for example, an image processing device 20 to be described later) that performs image processing on images of a machine (including, for example, a tool T to be described later) or a work captured by an imaging device (for example, a vision sensor 2 to be described later); and a numerical controller (for example, a numerical controller 10, 10B to be described later) that controls the machine and the image processing device on the basis of a program, wherein the numerical controller or the image processing device controls the imaging device, wherein the numerical controller includes: a program analysis unit (for example, an NC program analysis unit 11 or a ladder program analysis unit 11B to be described later) that analyzes the program; and an operation control information storage unit (for example, a macro variable value table storage unit 12 or a signal storage unit 12B to be described later) that stores operation control information necessary when controlling operations of the machine, the imaging device, and the image processing device in a format that can be read and written by the program analysis unit, and wherein the numerical control system includes: an image processing input/output item-to-operation control information conversion unit (for example, an image processing input/output item-to-variable number conversion unit 14 and an image processing input/output item-to-signal address conversion unit 14B to be described later) that converts commands that the program analysis unit reads from the program or the operation control information stored in the operation control information storage unit to image processing input items which are setting values of a format that can be recognized by the imaging device and the image processing device and converts image processing output items which are results of the image processing from the image processing device to operation control information of a format that can be recognized by the program analysis unit.

(2) In the numerical control system according to (1), the operation control information storage unit may be macro variables that can be read and written by the program analysis unit.

(3) In the numerical control system according to (1) or (2), the image processing input/output item-to-operation control information conversion unit may be disposed in the numerical controller.

(4) In the numerical control system according to (1) or (2), the image processing input/output item-to-operation control information conversion unit may be disposed in the image processing device.

According to the present invention, it is possible to reflect the imaging results of a machine or a work captured by an imaging device in a program.

BRIEF DESCRIPTION OF THE DRAWINGS

FIG. 3 is a diagram illustrating an example (the left part) and the description (the right part) of an NC program for controlling a vision sensor and an image processing device during imaging and image processing of a tool or a work.

FIG. 4 is a flowchart illustrating an operation of imaging and image processing of a tool or a work by the numerical control system according to the first embodiment.

FIG. 7 is a diagram illustrating an NC program including a utilization example of image processing results according to Example 1.

FIG. 8A is a diagram illustrating an arrangement of a vision sensor according to Example 2.

FIG. 8B is a diagram illustrating an NC program for imaging and image processing according to Example 2.

FIG. 8C is a diagram illustrating a macro variable value table according to Example 2.

FIG. 9A is a diagram illustrating an NC program including a utilization example of image processing results according to Example 2.

FIG. 9B is a diagram illustrating an operation according to the NC program (during machining) illustrated in FIG. 9A.

FIG. 11A is a diagram illustrating an arrangement of a vision sensor according to Example 3.

FIG. 11B is a diagram illustrating an NC program for imaging and image processing according to Example 3.

FIG. 11C is a diagram illustrating a macro variable value table according to Example 3.

FIG. 12 is a diagram illustrating an NC program including a utilization example of image processing results according to Example 3.

FIG. 14A is a diagram illustrating an NC program including a utilization example of image processing results according to Example 4.

FIG. 14B is a diagram illustrating an NC program including a utilization example of image processing results according to Example 4.

FIG. 14C is a diagram illustrating an NC program including a utilization example of image processing results according to Example 4.

FIG. 15 is a diagram illustrating a numerical control system according to a second embodiment.

FIG. 23 is a diagram illustrating an example (the left part) and the description (the right part) of an NC program for controlling a vision sensor and an image processing device during imaging and image processing of a tool or a work.

FIG. 25 is a diagram illustrating an example (the left part) and the description (the right part) of an NC program for controlling a vision sensor and an image processing device during imaging and image processing of a tool or a work.

DETAILED DESCRIPTION OF THE INVENTION

Figure 1:
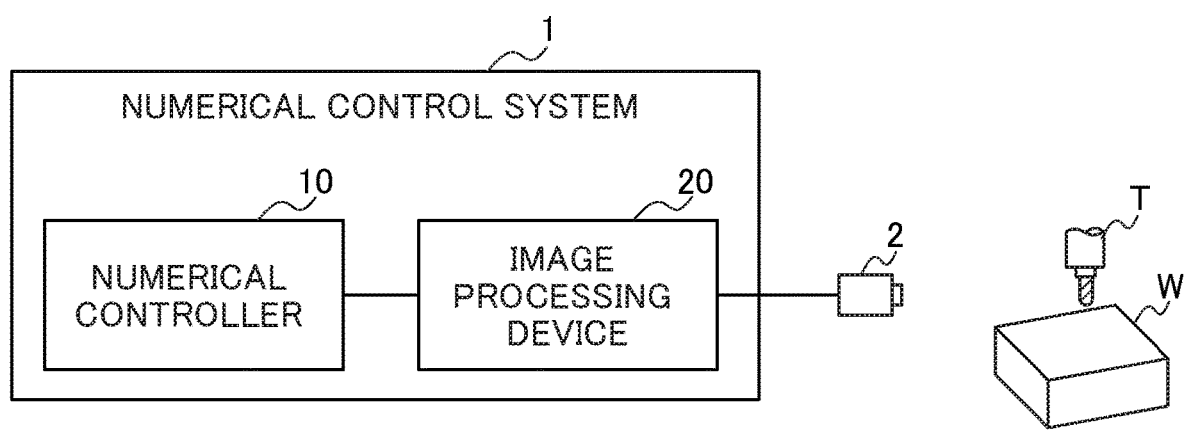
FIG. 1 is a diagram illustrating a numerical control system according to a first embodiment.

Hereinafter, an example of an embodiment of the present invention will be described with reference to the accompanying drawings. In the respective drawings, the same or corresponding portions will be denoted by the same reference numerals.

First Embodiment

FIG. 1 is a diagram illustrating a numerical control system according to a first embodiment. A numerical control system 1 illustrated in FIG. 1 is a system that controls a machine tool (not illustrated) and includes a numerical controller 10 and an image processing device 20. The image processing device 20 processes images of a tool T or a work W of a machine tool captured by a vision sensor (an imaging device) 2. The vision sensor 2 images the tool T or the work W of a machine tool. The imaging device is not limited to a vision sensor, and various imaging devices, such as a camera or a 3-dimensional vision sensor, may be used. The image provided from the imaging device to the image processing device 20 is not limited to a monochrome image, a color image, a distance image, or the like and may include a 3-dimensional point cloud or the like. The numerical controller 10 controls a machine tool on the basis of an NC program during machining of the work W. Moreover, the numerical controller 10 controls the vision sensor 2 and the image processing device 20 on the basis of the NC program during imaging and image processing of the tool T or the work W. In the following description, the numerical controller 10 and the image processing device 20 will be described in detail, focusing mostly on when imaging and image processing of the tool T or the work W is performed.

Figure 2:
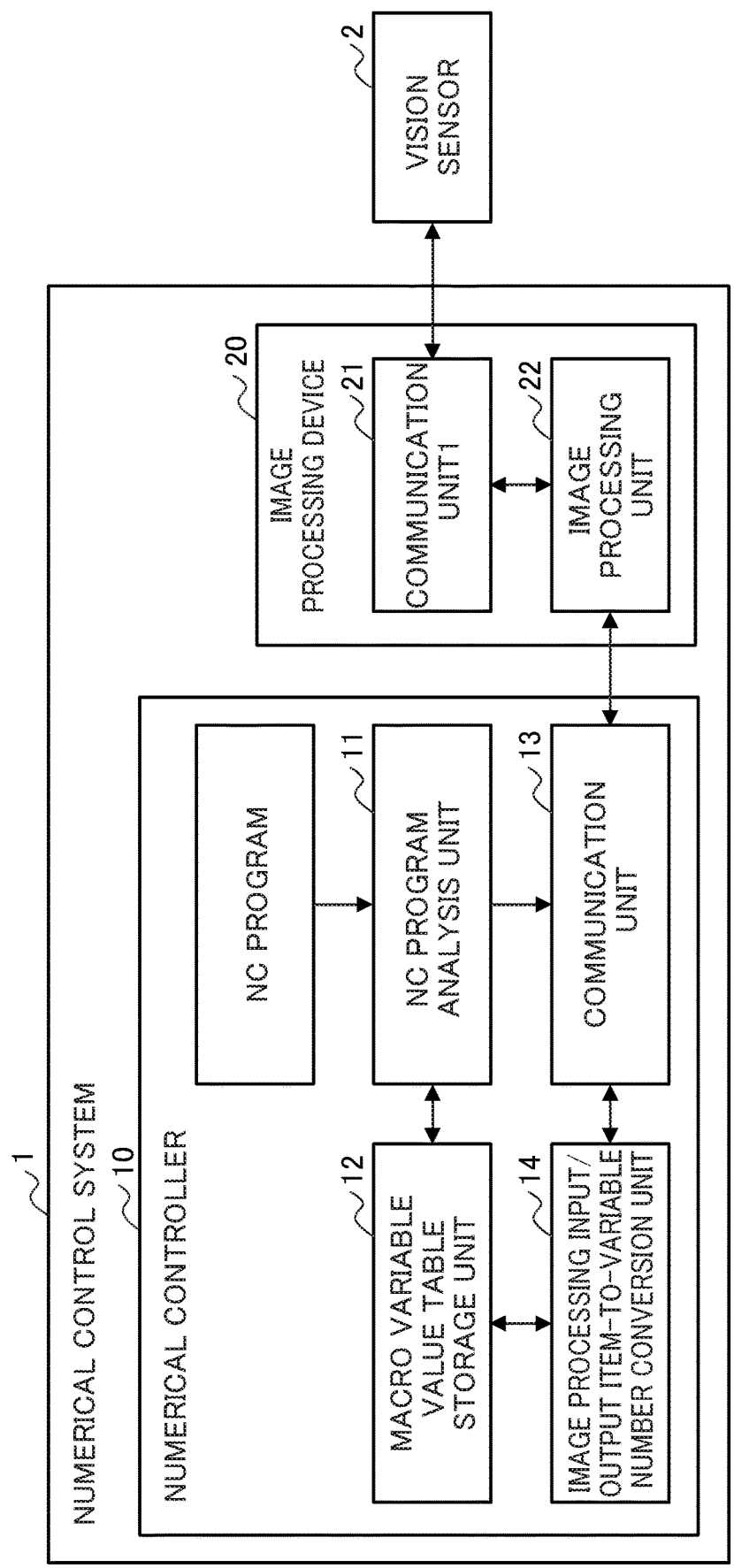
FIG. 2 is a diagram illustrating a numerical controller and an image processing device illustrated in FIG. 1 in detail.

FIG. 2 is a diagram illustrating the numerical controller 10 and the image processing device 20 illustrated in FIG. 1 in detail. As illustrated in FIG. 2, the numerical controller 10 includes an NC program analysis unit (a program analysis unit) 11, a macro variable value table storage unit (an operation control information storage unit) 12, a communication unit 13, and an image processing input/output item-to-variable number conversion unit (an image processing input/output item-to-operation control information conversion unit) 14.

FIG. 3 is a diagram illustrating an example (the left part) and the description (the right part) of an NC program for controlling the vision sensor 2 and the image processing device 20 during imaging and image processing of the tool T or the work W. As illustrated in FIG. 3, the NC program includes G-code commands, M-code commands, and macro variables. For example, "G810" is an imaging and image processing activation command (G-code command).

"#100" is a macro variable that designates a vision sensor to be used.

"#101" is a macro variable that designates an image processing program number.

"#201" is a macro variable indicating execution results (coordinate values of measurement points).

The NC program is stored in a rewritable memory (not illustrated) such as EEPROM, for example.

The NC program analysis unit 11 reads each block of the NC program and analyzes a command content. When the command is a macro variable write command, the NC program analysis unit 11 writes a macro variable value in a macro variable value table of the macro variable value table storage unit 12. Specifically, the NC program analysis unit 11 writes a macro variable value (for example, the right side of an equation) set in the command in a region of a macro variable value table corresponding to a macro variable number (for example, the left side of an equation) designated in the command. On the other hand, as illustrated in FIG. 3, when the command is an imaging and image processing activation command, the NC program analysis unit 11 outputs the imaging and image processing activation command to the communication unit 13.

The macro variable value table storage unit 12 stores the setting values (for example, tool information, work information, and a coordinate value of a characteristic portion) necessary for controlling the operation of a machine tool as the values of macro variables. Moreover, the macro variable value table storage unit 12 stores the setting values (for example, the resolution of the vision sensor 2 and an image processing program name) necessary for controlling the operation of the vision sensor 2 and the image processing device 20 as the values of macro variables. These setting values are set when the NC program is executed. Furthermore, the macro variable value table storage unit 12 stores the information on the tool T or the work W obtained as the results of the image processing by the image processing device 20 as the values of macro variables. For example, in the above-described example, the macro variable value table is set as follows.

100: Vision sensor number to be used
101: Image processing program number
201: Execution results (coordinate values of measurement points)

Here, the variable numbers "#100" and "#101" are macro variable names in which the values of image processing input items to be described later are stored, and the vision sensor number to be used and the image processing program number are the values of image processing input items. Moreover, the variable number "#201" is a macro variable name in which the values of image processing output items to be described later are stored, and execution results (the coordinate values of measurement points) are the values of image processing output items. In this manner, the macro variable value table storage unit 12 stores various setting values necessary for controlling the operation of the machine tool, the vision sensor 2, and the image processing device 20 as the macro variable values of the format that can be read and written by the NC program analysis unit 11. In other words, the macro variable value table storage unit 12 is a region in which an NC program creator can read and write data and in which the NC program analysis unit 11 can read and write data. The macro variable value table storage unit 12 is a rewritable memory such as EEPROM, for example.

The communication unit 13 reads the setting values necessary for operating the vision sensor 2 and the image processing device 20 from the macro variable value table of the macro variable value table storage unit 12 when an imaging and image processing activation command is output from the NC program analysis unit 11. The communication unit 13 transmits the imaging and image processing activation command and the setting value (the image processing input items to be described later and the values thereof) read from the macro variable value table to the image processing device 20 or the vision sensor 2. Moreover, the communication unit 13 receives the execution results of image processing from the image processing device 20 and writes the received execution results (the image processing output items to be described later and the values thereof) in the macro variable value table of the macro variable value table storage unit 12. In the present embodiment, the communication unit 13 performs reading of the setting values from the macro variable value table of the macro variable value table storage unit 12 and writing of the execution results of the imaging and image processing in the macro variable value table of the macro variable value table storage unit 12 with the aid of the image processing input/output item-to-variable number conversion unit 14. The communication unit 13 includes a communication interface compatible with cable or wireless communication standards, such as LAN or WAN, or near-field communication standards, such as Bluetooth or Wi-Fi.

When reading the setting values from the macro variable value table, the image processing input/output item-to-variable number conversion unit 14 converts the setting values (macro variable values) necessary for operating the vision sensor 2 and the image processing device 20 stored in the macro variable value table storage unit 12 to image processing input items which are setting values of a format that can be recognized by the vision sensor 2 and the image processing device 20. On the other hand, when writing the execution results of the imaging and image processing in the macro variable value table, the image processing input/output item-to-variable number conversion unit 14 converts the image processing output items which are the results of the image processing from the image processing device 20 to variables (macro variables) of the format that can be recognized by the NC program analysis unit 11.

As illustrated in FIG. 2, the image processing device 20 includes a communication unit 21 and an image processing unit 22. The communication unit 21 transmits an imaging activation command received from the numerical controller 10 and the setting values necessary for operating the vision sensor 2 to the vision sensor 2. Moreover, the communication unit 21 receives the captured images of the tool T or the work W from the vision sensor 2 and outputs the received captured images to the image processing device 20. The communication unit 13 includes a communication interface compatible with cable or wireless communication standards, such as LAN or WAN, or near-field communication standards, such as Bluetooth or Wi-Fi.

The image processing unit 22 processes the images from the vision sensor 2 on the basis of the image processing activation command received from the numerical controller 10 and the setting values necessary for operating the image processing unit 22 and transmits the execution results of the image processing to the numerical controller 10 as image processing output items.

The numerical controller 10 and the image processing device 20 are configured as an arithmetic processor such as, for example, a digital signal processor (DSP) or a field-programmable gate array (FPGA). Various functions of the numerical controller 10 and the image processing device 20 are realized by executing predetermined software (programs and applications) stored in a storage unit, for example. Various functions of the numerical controller 10 and the image processing device 20 may be realized by cooperation of hardware and software and may be realized by hardware (electronic circuits) only.

Next, an operation of imaging and image processing of the tool T or the work W by the numerical control system 1 according to the first embodiment will be described with reference to FIG. 4. FIG. 4 is a flowchart illustrating an operation of imaging and image processing of the tool T or the work W by the numerical control system 1 according to the first embodiment. First, the NC program analysis unit 11 of the numerical controller 10 reads one block of an NC program (S1) and analyzes a command content (S2). When the command is a macro variable write command, the NC program analysis unit 11 writes a macro variable value in the macro variable value table of the macro variable value table storage unit 12 (S3). Specifically, the NC program analysis unit 11 writes a macro variable value (for example, the right side of an equation) set in the command in a region of the macro variable value table corresponding to the macro variable number (for example, the left side of an equation) designated in the command (S3). After that, the flow proceeds to step S11 to be described later.

On the other hand, when the command in step S2 is an imaging and image processing activation command, the communication unit 13 requests the image processing input/output item-to-variable number conversion unit 14 to read the values of image processing input items (S4). Subsequently, the image processing input/output item-to-variable number conversion unit 14 converts the image processing input items to predetermined variable numbers, reads the values of the converted variable numbers from the macro variable value table of the macro variable value table storage unit 12, and returns the read values of the variable numbers to the communication unit 13 as the values of image processing input items (S5). Subsequently, the communication unit 13 transmits the imaging and image processing activation command and the values of the image processing input items acquired from the image processing input/output item-to-variable number conversion unit 14 to the image processing device 20 (S6).

The image processing unit 22 of the image processing device 20 operates the vision sensor 2 via the communication unit 21 on the basis of the imaging and image processing activation command received from the numerical controller 10 and performs imaging of the tool T or the work W of the machine tool (S7). Subsequently, the image processing unit 22 executes image processing on the captured images from the vision sensor 2 and obtains the values of image processing output items corresponding to the values of image processing input items (S8).

Subsequently, the communication unit 13 of the numerical controller 10 acquires the values (execution results) of image processing output items from the image processing device 20 and outputs the same to the image processing input/output item-to-variable number conversion unit 14 (S9). Subsequently, the image processing input/output item-to-variable number conversion unit 14 regards the values of image processing output items acquired from the communication unit 13 as the values of predetermined variable numbers and writes the same in the region of the macro variable value table of the macro variable value table storage unit 12 corresponding to the variable numbers (S10).

Subsequently, the NC program analysis unit 11 determines whether analysis of all blocks of the NC program has ended (S11). When analysis of all blocks of the NC program has not ended, the flow returns to step S1, and the processes of steps S1 to S11 are performed for the next one block of the NC program. On the other hand, when analysis of all blocks of the NC program has ended in step S11, the numerical control system 1 ends the operation of imaging and image processing of the tool T or the work W.

Hereinafter, although the present embodiment will be described in detail by way of specific examples, the present embodiment is not limited to these specific examples.

Example 1

Figure 5A:
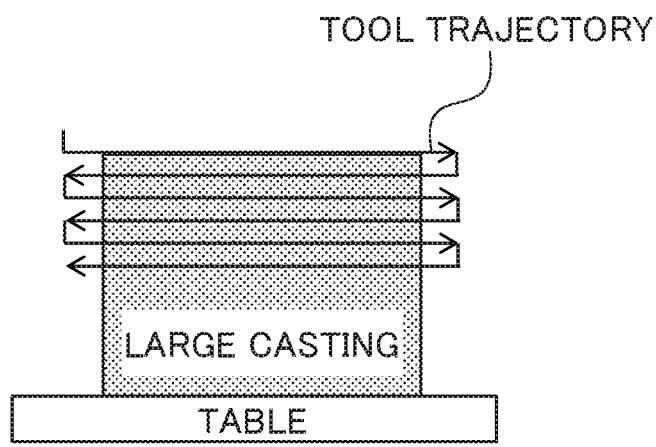
FIG. 5A is a diagram illustrating a relation between a tool trajectory according to the NC program and a large casting.
Figure 5B:
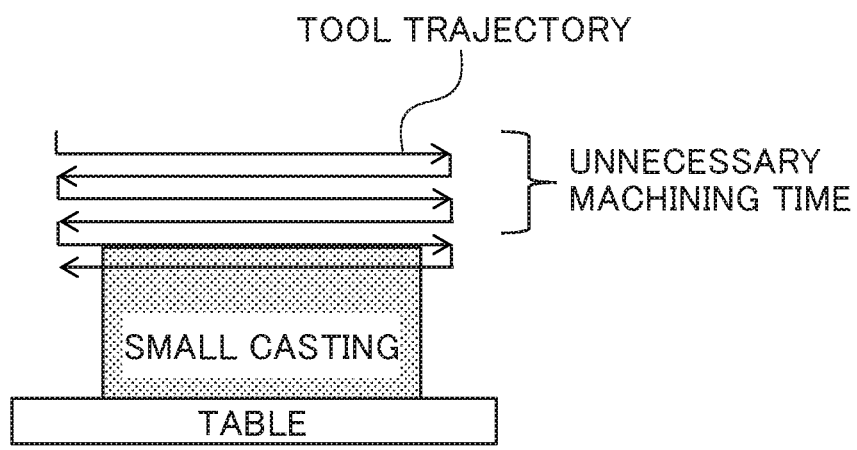
FIG. 5B is a diagram illustrating a relation between a tool trajectory according to the NC program and a small casting.

For example, as illustrated in FIGS. 5A and 5B, since pure castings have different dimensions from one casting to another, the NC program is created such that even a casting of large dimensions can be machined. When this NC program is used for a casting of small dimensions, a non-cutting (air-cut) time in a tool trajectory increases and an unnecessary machining time increases.

Figures 6A, 6B, 6C:
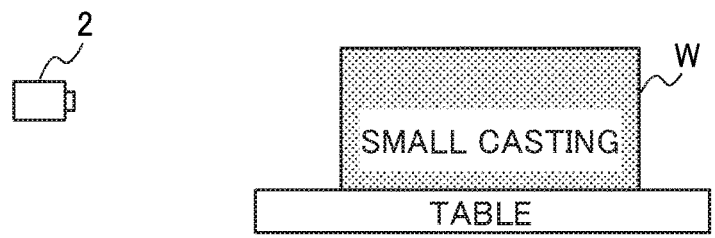
FIG. 6A is a diagram illustrating an arrangement of a vision sensor according to Example 1.
FIG. 6B is a diagram illustrating an NC program for imaging and image processing according to Example 1.
FIG. 6C is a diagram illustrating a macro variable value table according to Example 1.

Therefore, in Example 1, the coordinate value of an uppermost surface of a casting W is stored in the macro variable value table as a macro variable value by imaging and image processing of the casting W. In this way, the coordinate value of the uppermost surface of the casting W can be reflected in the NC program. First, as illustrated in FIG. 6A, a vision sensor 2 (for example, a 3-dimensional vision sensor) is provided to face the casting W. Subsequently, the image processing unit receives images (for example, a 3-dimensional point cloud) of the casting W captured by the vision sensor 2 and calculates the coordinate value of the uppermost surface of the casting W on the basis of the images. This may be realized by ordinary image processing software. Subsequently, as illustrated in FIG. 6B, an NC program for imaging and image processing is created. In this case, the image processing input item and the image processing output item are set as follows.

Image processing input item: Vision sensor number to be used (#100), Image processing program number (#101)

Image processing output item: Coordinate value of uppermost surface of casting W (#201)

Subsequently, when the NC program is executed, imaging and image processing is executed according to the flowchart of FIG. 4, and the execution results of the image processing are stored in the macro variable value table as illustrated in FIG. 6C.

In this way, an NC program creator can read the macro variable value table during machining and create such an NC program that only a region where the casting W is present is machined (for example, cut). For example, the NC program analysis unit 11 can read the macro variable value table illustrated in FIG. 6C and, when the value in #201 (the coordinate value of the uppermost surface of the casting) is small, create the NC program so that blocks for machining a portion higher than the uppermost surface are not executed, as illustrated in FIG. 7. In this way, the non-cutting (air-cut) time decreases and the machining time is reduced.

Example 2

For example, as illustrated in FIG. 8A, when a work W is machined, chips may gather in a machining region. When too many chips gather in the machining region, malfunctioning of a machine or machining fault of the work W may occur.

Therefore, in Example 2, a chip deposition amount and a chip deposition region (positions of points) are stored in the macro variable value table as macro variable values by imaging and image processing of the machining region of the work W. In this way, an NC program can be created so as to remove the chips according to the chip deposition amount and the chip deposition region (the positions of points) in the machining region of the work W. First, as illustrated in FIG. 8A, the vision sensor 2 is provided so as to face a region in which chips of the work W are likely to be deposited. Subsequently, the image processing unit 22 receives images of a region where chips of the work W are likely to be deposited, captured by the vision sensor 2, generates a flag indicating that a certain amount of chip has gathered, and calculates the chip deposition region (the positions of points) X and Y on the basis of the images. For example, whether chips are deposited or the position of deposition may be calculated by detecting a difference in brightness using a histogram, for example. This may be realized by ordinary image processing software. Subsequently, as illustrated in FIG. 8B, an NC program for imaging and image processing is created. In this case, the image processing input item and the image processing output item are set as follows.

Image processing input item: Vision sensor number to be used (#100), Image processing program number (#101)

Image processing output item: Flag indicating a certain amount of chip has gathered, Chip deposition region (positions of points) X, Y (#201, #202, #203).

Subsequently, when the NC program is executed, imaging and image processing is executed according to the flowchart of FIG. 4, and the execution results of the image processing are stored in the macro variable value table as illustrated in FIG. 8C.

In this way, an NC program creator can read the macro variable value table during machining and create such an NC program that a table is moved so that a cutting liquid contacts the chip deposition region of the work W, as illustrated in FIGS. 9A and 9B. In this way, it is possible to cause the cutting liquid to contact the chips intensively to remove the chips and prevent malfunctioning of the machine or machining fault of the work W.

Example 3

Figures 10A, 10B:
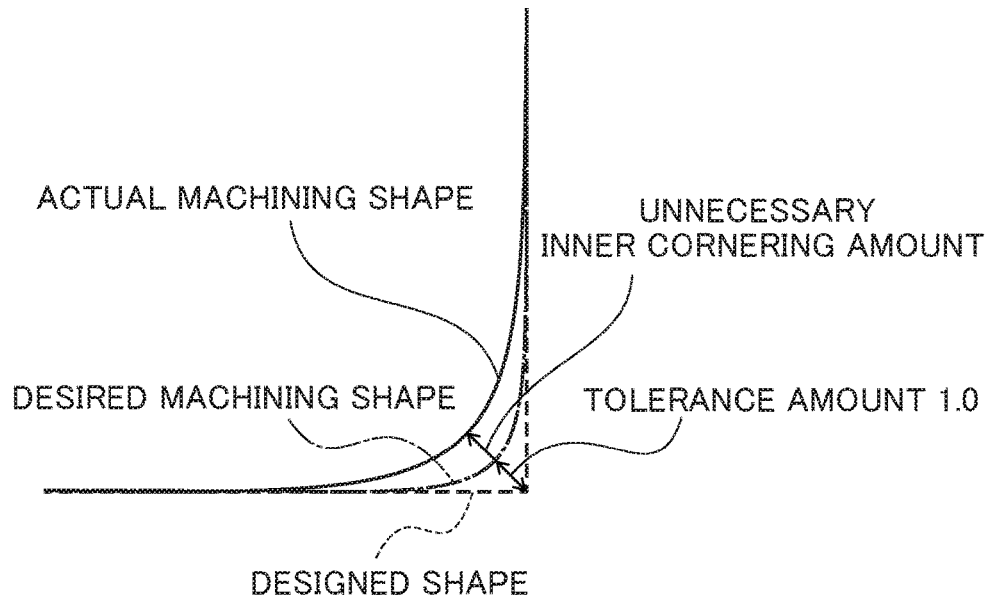
FIG. 10A is a diagram for describing a tolerance amount.
FIG. 10B is a diagram illustrating an example of an NC program (during machining) that designates a tolerance amount.

As illustrated in FIGS. 10A and 10B, a machining program has a corner connection function that connects corner portions smoothly. In the corner connection function, a tolerance amount (an upper limit in which a machining work shape is allowed to deviate from a designed shape) of an NC program can be designated as an argument. However, when machining is performed actually, an inner cornering error occurs unnecessarily due to a servo delay, and the tolerance amount may be re-designated to a smaller value by an amount corresponding to the inner cornering error. However, manual re-designation of the tolerance amount incurs time.

Therefore, in Example 3, the distance of a portion in which an actual shape of the work W most greatly deviates from a desired shape is stored in the macro variable value table as the macro variable value by the imaging and image processing of the work W. In this way, the NC program can be created so that the tolerance amount is corrected automatically. First, as illustrated in FIG. 11A, the vision sensor 2 is provided so as to face the work W. Subsequently, the image processing unit receives the images of the work W captured by the vision sensor 2 and calculates the distance of a portion in which the actual shape most greatly deviates from an ideal shape on the basis of the images. For example, the image processing output items may be calculated as follows.

An ideal shape of the work W is taught in advance.

The distance between an arbitrary ideal point of an ideal shape and an arbitrary actual machining shape point of the obtained actual shape is calculated for a plurality of arbitrary points.

The smallest value of the distances between one "ideal point" and a plurality of "actual machining shape points" is selected.

The smallest values in a plurality of "ideal points" are selected and the largest value thereof is output.

This may be realized by ordinary image processing software. Subsequently, as illustrated in FIG. 11B, an NC program for imaging and image processing is created. In this case, the image processing input item and the image processing output item are set as follows.

Image processing input item: Vision sensor number to be used (#100), Image processing program number (#101)

Image processing output item: Distance of portion in which actual shape most greatly deviates from desired shape (#201)

Subsequently, when the NC program is executed, imaging and image processing is executed according to the flowchart of FIG. 4, and the execution results of the image processing are stored in the macro variable value table as illustrated in FIG. 11C.

In this way, it is possible to create an NC program that automatically corrects the designated value of the tolerance amount on the basis of the distance of the portion in which the actual shape most greatly deviates from a desired shape, as shown in FIG. 12. Therefore, it is possible to eliminate the time and effort of re-designating the tolerance amount manually.

Example 4

Figures 13A, 13B, 13C:
FIG. 13A is a diagram illustrating an arrangement of a vision sensor according to Example 4.
FIG. 13B is a diagram illustrating an NC program for imaging and image processing according to Example 4.
FIG. 13C is a diagram illustrating a macro variable value table according to Example 4.

In Example 4, a tool length is stored in the macro variable value table by imaging and image processing of a tool T. In this way, a program can be created so that a tool is replaced, machining is stopped, tool information is set to a numerical controller, or the like. First, as illustrated in FIG. 13A, the vision sensor 2 is provided so as to face the tool T. Subsequently, the image processing unit receives the images of the tool T captured by the vision sensor 2 and calculates a tool length on the basis of the images. This may be realized by ordinary image processing software. Subsequently, as illustrated in FIG. 13B, an NC program for imaging and image processing is created. In this case, the image processing input item and the image processing output item are set as follows.

Image processing input item: Vision sensor number to be used (#100), Image processing program number (#101)

Image processing output item: Tool length (#201)

Subsequently, when the NC program is executed, imaging and image processing is executed according to the flowchart of FIG. 4, and the execution results of the image processing are stored in the macro variable value table, as illustrated in FIG. 13C.

In this way, it is possible to read the macro variable value table during machining, and when the tool length obtained as the image processing result is different from a tool length set in advance in the numerical controller 10, it is possible to create an NC program according to a situation based on the determination of a programmer of the NC program as follows.

(A) An NC program may be created so that when a tool is imaged immediately before machining is performed and a programmer determines that there is a possibility that the tool is broken, the tool is replaced with another tool of the same type attached to a tool magazine of the machine tool in order to perform machining properly, as illustrated in FIG. 14A.

(B) An NC program may be created so that when a tool is imaged immediately after machining is performed and a programmer determines that there is a possibility that the tool may be broken during machining and machining may be not performed properly, machining is stopped as illustrated in FIG. 14B.

(C) An NC program may be created so that when a programmer determines that there is little possibility that a tool is broken, for example, when the length of a new tool is measured, the tool length obtained as the image processing result is overwritten to the value set in advance in the numerical controller 10, as illustrated in FIG. 14C.

As described above, according to the numerical control system 1 of the present embodiment, the image processing input/output item-to-variable number conversion unit (the image processing input/output item-to-operation control information conversion unit) 14 converts the image processing output items which are the results of image processing of the image processing device 20 to macro variable values (operation control information) of a format that can be recognized by the NC program analysis unit 11. In this way, the NC program analysis unit 11 can receive the execution results (the image processing output items) of the image processing by reading the macro variables. Therefore, the imaging results of the tool T or the work W of the machine tool captured by the vision sensor 2 can be reflected in the NC program.

However, when the operation of the vision sensor 2 and the image processing device 20 is controlled using the arguments of the G-code commands like the technology disclosed in Patent Document 1, since the number of arguments is limited by the format of the G-code command, the number of designatable setting values is likely to be limited. For example, in the case of a format in which the type of argument is designated by one alphabet character, the number of alphabet characters is the upper limit of the number of designatable setting values. In this regard, according to the numerical control system 1 of the present embodiment, the image processing input/output item-to-variable number conversion unit (the image processing input/output item-to-operation control information conversion unit) 14 converts the macro variable values (operation control information) stored in the macro variable value table storage unit (the operation control information storage unit) 12 in the format that can be read and written by the NC program analysis unit 11 to the image processing input items which are the setting values of the format that can be recognized by the imaging device 2 and the image processing device 20. In this way, it is possible to increase the number of macro variables by increasing the size of a region that can be used as the macro variable value table storage unit. Therefore, the number of designatable setting values is rarely limited. Moreover, it is easy to cope with an increase in the number of macro variables and expandability is high.

Second Embodiment

In the first embodiment, although an aspect in which the image processing input/output item-to-variable number conversion unit 14 is disposed in the numerical controller 10 has been illustrated, the image processing input/output item-to-variable number conversion unit 14 may be disposed in the image processing device 20.

FIG. 15 is a diagram illustrating a numerical control system according to the second embodiment. The numerical control system 1 of the second embodiment illustrated in FIG. 15 is different from the numerical control system 1 of the first embodiment illustrated in FIG. 2 in that the image processing input/output item-to-variable number conversion unit 14 is disposed in the image processing device 20.

Figure 16:
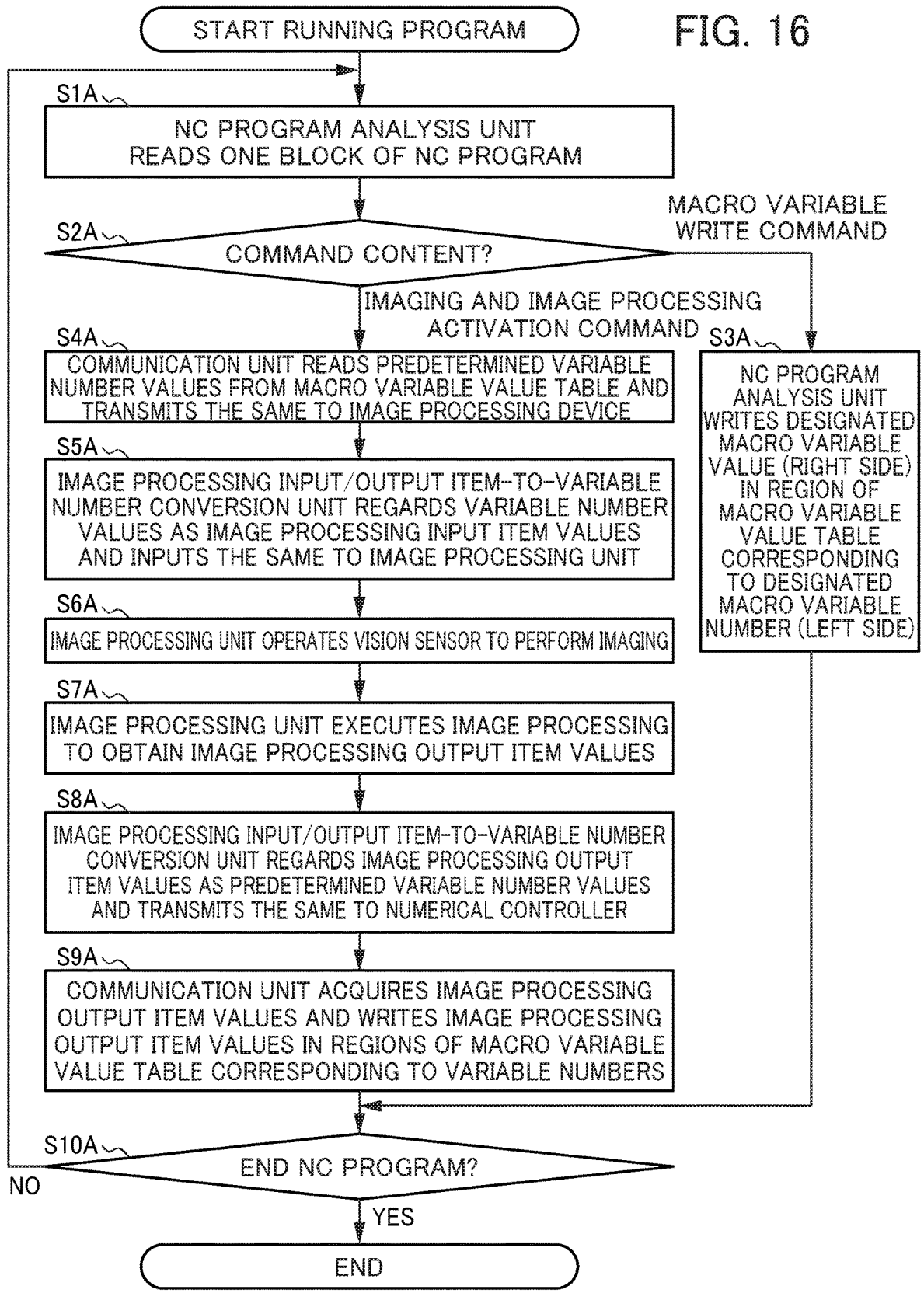
FIG. 16 is a flowchart illustrating an operation of imaging and image processing of a tool or a work by the numerical control system according to the second embodiment.

Next, an operation of imaging and image processing of the tool T or the work W by the numerical control system 1 according to the second embodiment will be described with reference to FIG. 16. FIG. 16 is a flowchart illustrating an operation of imaging and image processing of the tool T or the work W by the numerical control system 1 according to the second embodiment. First, similarly to steps S1 and S2, the NC program analysis unit 11 of the numerical controller 10 reads one block of the NC program (S1A) and analyzes a command content (S2A). When the command is a macro variable write command, similarly to step S3, the NC program analysis unit 11 writes a macro variable value in a macro variable value table of the macro variable value table storage unit 12 (S3A). Specifically, the NC program analysis unit 11 writes a macro variable value (for example, the right side of an equation) set in the command in a region of a macro variable value table corresponding to a macro variable number (for example, the left side of an equation) designated in the command (S3A). After that, the flow proceeds to step S10A to be described later.

On the other hand, when the command is an imaging and image processing activation command in step S2A, the communication unit 13 reads the values of predetermined variable numbers from the macro variable value table of the macro variable value table storage unit 12. The communication unit 13 transmits the imaging and image processing activation command and the read values of the variable numbers to the image processing device 20 (S4A).

The image processing input/output item-to-variable number conversion unit 14 of the image processing device 20 regards the values of the variable numbers received from the numerical controller 10 as the image processing input item and inputs the same to the image processing unit 22 (S5A). Subsequently, similarly to step S7, the image processing unit 22 operates the vision sensor 2 via the communication unit 21 on the basis of the imaging and image processing activation command received from the numerical controller 10 to image the tool T or the work W of the machine tool (S6A). Subsequently, similarly to step S8, the image processing unit 22 executes image processing on the captured images obtained by the vision sensor 2 to obtain values of image processing output items corresponding to the values of the image processing input items (S7A). Subsequently, the image processing input/output item-to-variable number conversion unit 14 regards the image processing output item values as the value of the predetermined variable numbers and transmits the image processing output item values to the numerical controller 10 (S8A).

Subsequently, the communication unit 13 of the numerical controller 10 acquires the image processing output item values (execution results) from the image processing device 20 and writes the acquired image processing output item values in the region of the macro variable value table of the macro variable value table storage unit 12 corresponding to the variable numbers (S9A).

Subsequently, similarly to step S11, the NC program analysis unit 11 determines whether analysis of all blocks of the NC program has ended (S10A). When analysis of all blocks of the NC program has not ended, the flow returns to step S1A and the processes of steps S1A to S10A are performed for the next one block of the NC program. On the other hand, when analysis of all blocks of the NC program has ended in step S10A, the numerical control system 1 ends the operation of imaging and image processing of the tool T or the work W.

In the numerical control system 1 of the second embodiment, the same advantages as those of the numerical control system 1 of the first embodiment can be obtained. According to the numerical control system 1 of the second embodiment, the features of the present invention can be realized in the existing numerical controller.

Third Embodiment

In the first embodiment, the numerical control system 1 that reflects the results of imaging and image processing of the tool T or the work W of the machine tool in the NC program has been described. In a third embodiment, a numerical control system that reflects the results of imaging and image processing of the tool T or the work W of a machine tool in a ladder program will be described.

Figure 17:
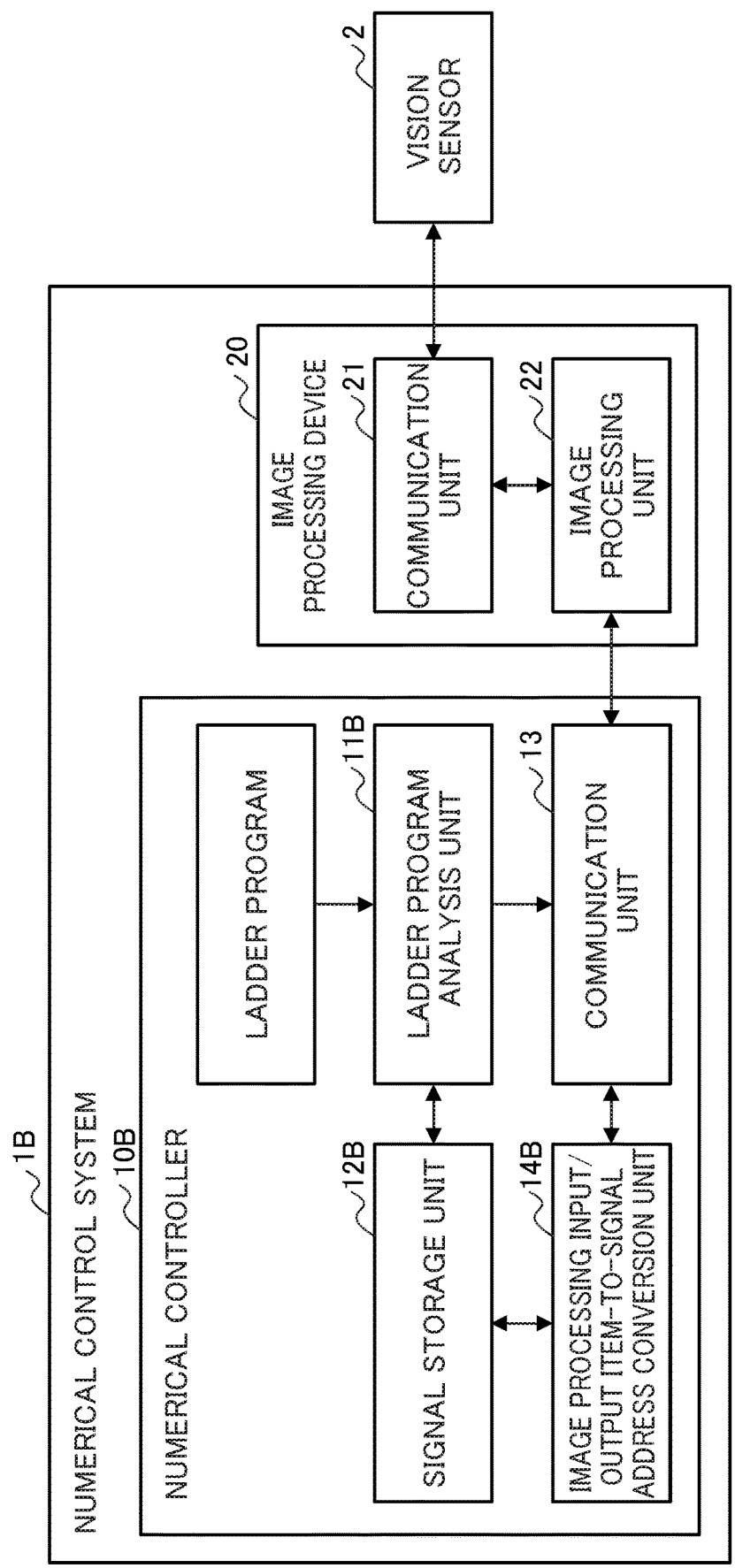
FIG. 17 is a diagram illustrating a numerical control system according to a third embodiment.

FIG. 17 is a diagram illustrating a numerical control system according to the third embodiment. A numerical control system 1B illustrated in FIG. 17 is different from the numerical control system 1 of the first embodiment illustrated in FIG. 2 in that a numerical controller 10B is included instead of the numerical controller 10. The numerical controller 10B is different from the numerical controller 10 of the first embodiment in that a ladder program is used as the NC program, and a ladder program analysis unit (a program analysis unit) 11B, a signal storage unit (an operation control information storage unit) 12B, and an image processing input/output item-to-signal address conversion unit (an image processing input/output item-to-operation control information conversion unit) 14B are provided instead of the NC program analysis unit 11, the macro variable value table storage unit 12, and the image processing input/output item-to-variable number conversion unit 14.

Figure 18:
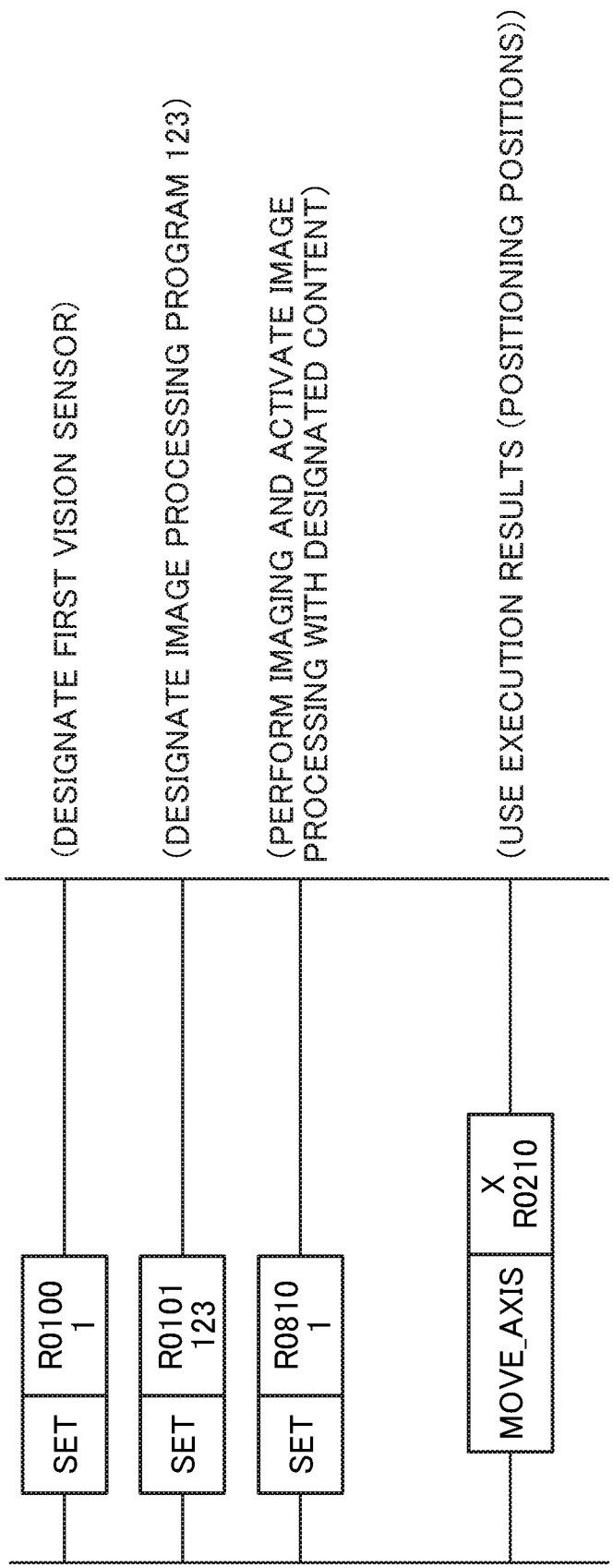
FIG. 18 is a diagram illustrating an example (the left part) and the description (the right part) of a ladder program for controlling a vision sensor and an image processing device during imaging and image processing of a tool or a work.

FIG. 18 is a diagram illustrating an example (the left part) and the description (the right part) of a ladder program for controlling the vision sensor 2 and the image processing device 20 during imaging and image processing of the tool T or the work W. As illustrated in FIG. 18, the ladder program includes commands and signal regions. For example, "R0810" is an imaging and image processing activation command.

"R0100" is a signal region that designates a vision sensor to be used.

"R0101" is a signal region that designates an image processing program number.

"R0210" is a signal region that indicates an execution result (the coordinate value of a measurement point).

The ladder program is stored in a rewritable memory (not illustrated) such as EEPROM, for example.

The ladder program analysis unit 11B reads each block of the ladder program and analyzes a command content. When the command is a signal region write command like SET (R0100,1) and SET (R0101,123) in FIG. 18, the ladder program analysis unit 11B writes an argument in the signal region of the signal storage unit 12B. Specifically, the ladder program analysis unit 11B writes a second argument in a signal region corresponding to a signal address designated in a first argument of the command. On the other hand, when the command is an imaging and image processing activation command like SET (R0810,1) in FIG. 18, the ladder program analysis unit 11B outputs the imaging and image processing activation command to the communication unit 13.

The signal storage unit 12B stores setting values (for example, tool information, work information, and a coordinate value of a characteristic portion) necessary for controlling the operation of a machine tool as signals. Moreover, the signal storage unit 12B stores the setting values (for example, the resolution of the vision sensor 2 and an image processing program name) necessary for controlling the operation of the vision sensor 2 and the image processing device 20 as the macro variables. These setting values are set when the ladder program is executed. Furthermore, the signal storage unit 12B stores the information on the tool T or the work W obtained as the results of the image processing by the image processing device 20 as the macro variables. For example, the signal region of the signal storage unit 12B is set as follows.

R0100: Vision sensor number to be used
R0101: Image processing program number
R0210: Execution results (coordinate values of measurement points)

Here, the variable numbers "R0100" and "R0101" are signal names in which the values of image processing input items to be described later are stored, and the vision sensor number to be used and the image processing program number are the values of image processing input items. Moreover, the variable number "R0210" is a signal name in which the values of image processing output items to be described later are stored, and the execution results (the coordinate values of measurement points) are the values of image processing output items. In this manner, the signal storage unit 12B stores various setting values necessary for controlling the operation of the machine tool, the vision sensor 2, and the image processing device 20 as signals of a format that can be read and written by the ladder program analysis unit 11B. In other words, the signal storage unit 12B is a region in which a ladder program creator can read and write data and in which the ladder program analysis unit 11B can read and write data. The signal storage unit 12B is a rewritable memory such as EEPROM, for example.

When reading setting values from the signal region, the image processing input/output item-to-signal address conversion unit 14B converts the setting values (signals) necessary for operating the vision sensor 2 and the image processing device 20 stored in the signal storage unit 12B to image processing input items which are setting values of the format that can be recognized by the vision sensor 2 and the image processing device 20. On the other hand, when writing the execution results of the imaging and image processing in the signal region, the image processing input/output item-to-signal address conversion unit 14B converts the image processing output items which are the results of image processing from the image processing device 20 to signals of the format that can be recognized by the ladder program analysis unit 11B.

Figure 19:
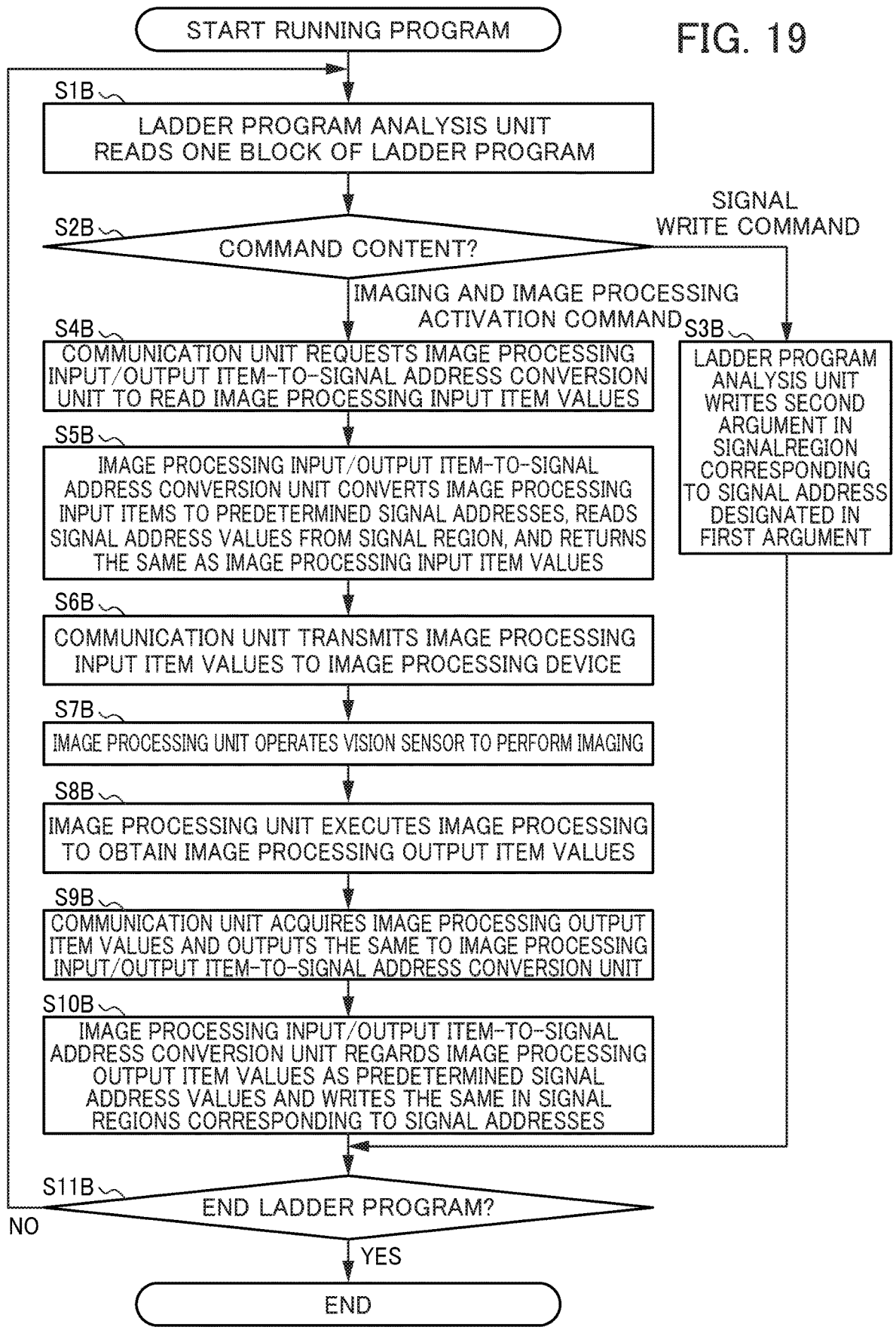
FIG. 19 is a flowchart illustrating an operation of imaging and image processing of a tool or a work by the numerical control system according to the second embodiment.

Next, an operation of imaging and image processing of the tool T or the work W by the numerical control system 1B according to the third embodiment will be described with reference to FIG. 19. FIG. 19 is a flowchart illustrating an operation of imaging and image processing of the tool T or the work W by the numerical control system 1B according to the third embodiment. First, the ladder program analysis unit 11B of the numerical controller 10B reads one block of the ladder program (S1B) and analyzes a command content (S2B). When the command is a signal write command, the ladder program analysis unit 11B writes an argument in the signal region of the signal storage unit 12B (S3B). Specifically, the ladder program analysis unit 11B writes a second argument in a signal region corresponding to a signal address designated in a first argument of the command (S3B). After that, the flow proceeds to step S11B to be described later.

On the other hand, when the command is an imaging and image processing activation command in step S2B, the communication unit 13 requests the image processing input/output item-to-signal address conversion unit 14B to read the values of image processing input items (S4B). Subsequently, the image processing input/output item-to-signal address conversion unit 14B converts the image processing input items to predetermined signal addresses, reads the values of the converted signal addresses from the signal region of the signal storage unit 12B, and returns the read signal address values to the communication unit 13 as the values of image processing input items (S5B). Subsequently, the communication unit 13 transmits the imaging and image processing activation command and the image processing input item values acquired from the image processing input/output item-to-signal address conversion unit 14B to the image processing device 20 (S6B).

Similarly to step S7, the image processing unit 22 of the image processing device 20 operates the vision sensor 2 via the communication unit 21 on the basis of the imaging and image processing activation command received from the numerical controller 10B and images the tool T or the work W of the machine tool (S7B). Subsequently, similarly to step S8, the image processing unit 22 executes image processing on the captured images obtained by the vision sensor 2 to obtain values of image processing output items corresponding to the values of the image processing input item (S8B).

Subsequently, the communication unit 13 of the numerical controller 10B acquires the values (execution results) of the image processing output items from the image processing device 20 and outputs the same to the image processing input/output item-to-signal address conversion unit 14B (S9B). Subsequently, the image processing input/output item-to-signal address conversion unit 14B regards the image processing output item values acquired from the communication unit 13 as the values of predetermined signal addresses and writes the same in the signal region of the signal storage unit 12B corresponding to the signal addresses (S10B).

Subsequently, the ladder program analysis unit 11B determines whether analysis of all blocks of the ladder program has ended (S11B). When analysis of all blocks of the ladder program has not ended, the flow returns to step S1B, and the processes of steps S1B to S11B are performed for the next one block of the ladder program. On the other hand, when the analysis of all blocks of the ladder program has ended in step S11B, the numerical control system 1B ends the operation of the imaging and image processing of the tool T or the work W.

Hereinafter, although the present embodiment will be described in detail by way of specific examples, the present embodiment is not limited to these specific examples.

Example 5

For example, as described above in Example 2, when a work W is machined, chips may gather in a machining region. When too many chips gather in the machining region, malfunctioning of a machine or machining fault of the work W may occur.

Figure 20A:
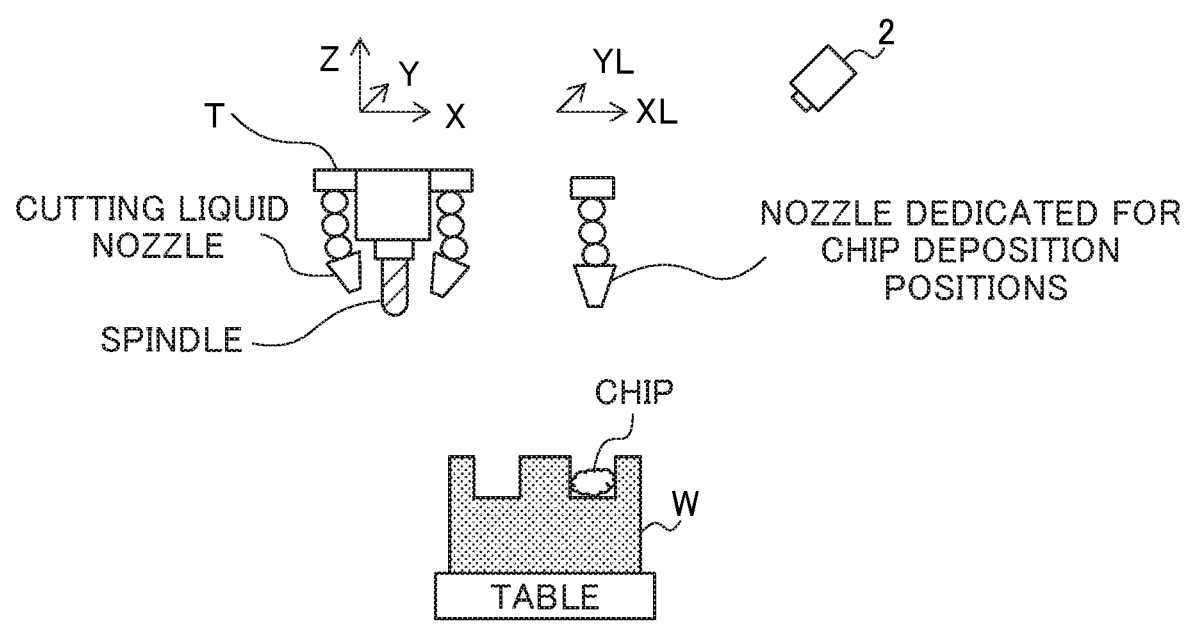
FIG. 20A is a diagram illustrating an arrangement of a vision sensor according to Example 5.
Figures 20B, 20C:
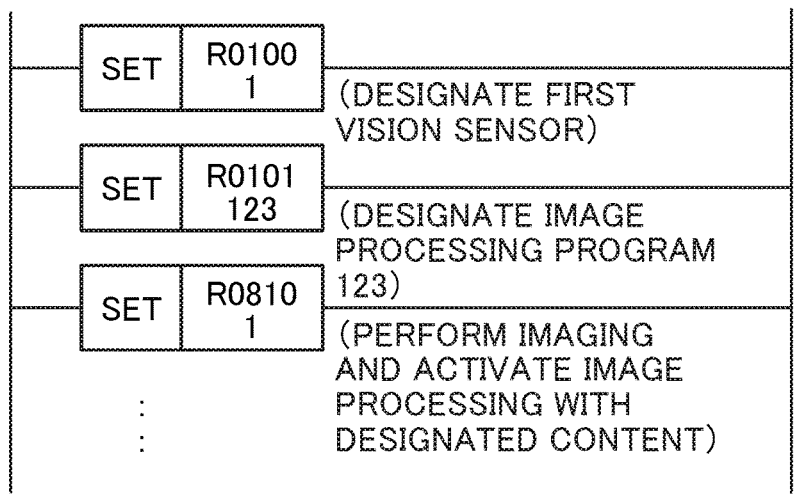
FIG. 20B is a diagram illustrating a ladder program for imaging and image processing according to Example 5.
FIG. 20C is a diagram illustrating a signal region according to Example 5.

Therefore, in Example 5, a chip deposition amount and a chip deposition region (positions of points) are stored in the signal region as signals by imaging and image processing of the machining region of the work W. In this way, an NC program can be created so as to remove the chips according to the chip deposition amount and the chip deposition region (the positions of points) in the machining region of the work W. First, as illustrated in FIG. 20A, the vision sensor 2 is provided so as to face a region in which chips of the work W are likely to be deposited. In this example, the tool T (a spindle and a cutting liquid nozzle) is moved in the X, Y, and Z-directions according to a movement command of the NC program. A nozzle dedicated for chip deposition portions is a nozzle for removing deposited chips. The nozzle dedicated for chip deposition portions is moved according to a movement command of the ladder program in the XL and YL-directions extending along movement axes XL and YL for the nozzle dedicated for chip deposition portions different from the movement axes X, Y, and Z of the spindle. Subsequently, the image processing unit receives images of a region where chips of the work W are likely to be deposited, captured by the vision sensor 2, generates a flag indicating that a certain amount of chip has gathered, and calculates the chip deposition region (the positions of points) X and Y on the basis of the images. For example, whether chips are deposited or the position of deposition may be calculated by detecting a difference in brightness using a histogram, for example. This may be realized by ordinary image processing software. Subsequently, as illustrated in FIG. 20B, a ladder program for imaging and image processing is created. In this case, the image processing input item and the image processing output item are set as follows.
Image processing input item: Vision sensor number to be used (#100), Image processing program number (#101)
Image processing output item: Flag indicating a certain amount of chip has gathered, Chip deposition region (positions of points) X, Y (#201, #202, #203).
Subsequently, when the ladder program is executed, imaging and image processing is executed according to the flowchart of FIG. 19, and the execution results of the image processing are stored in the signal region, as illustrated in FIG. 20C.

Figure 21:
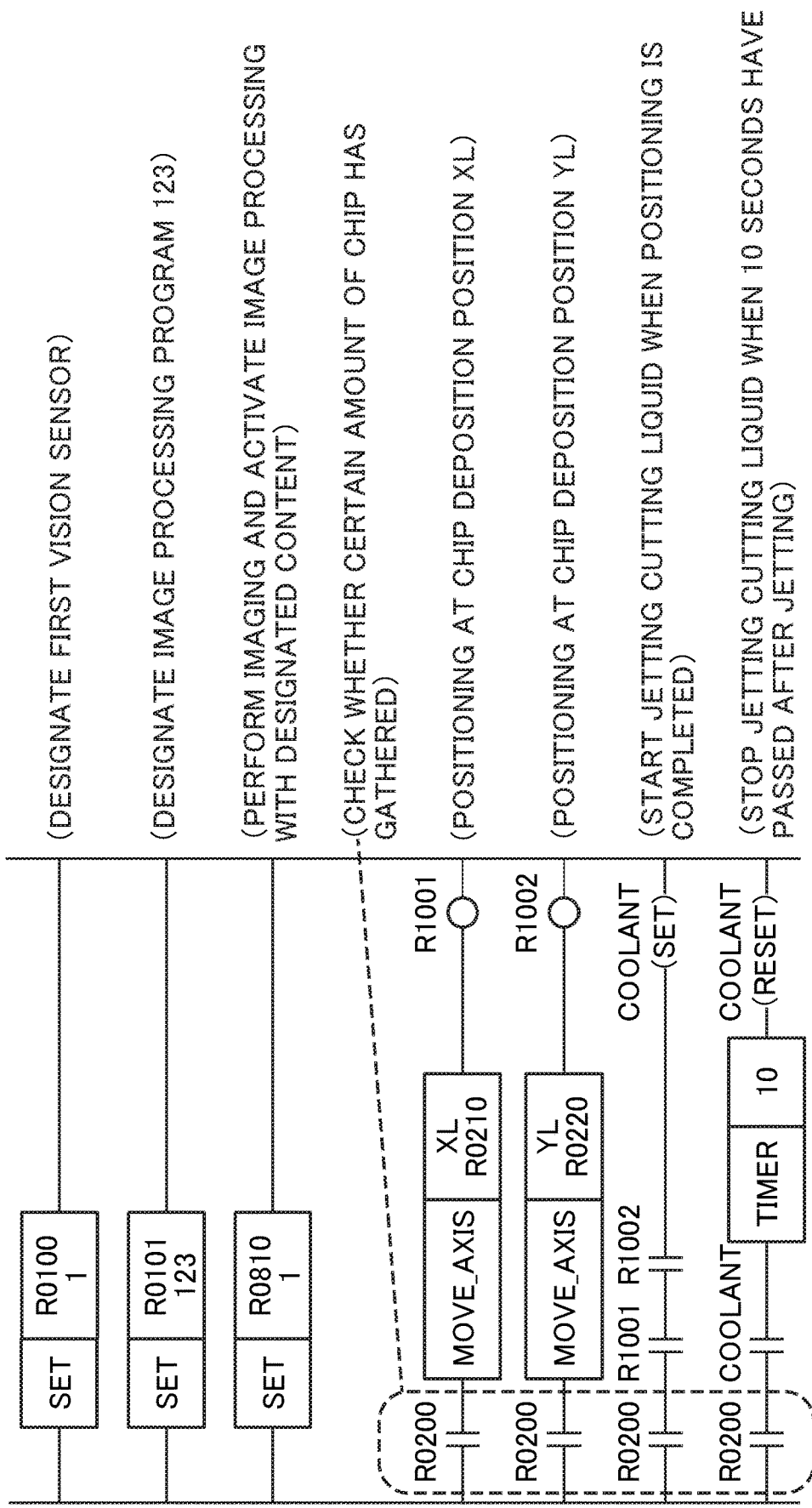
FIG. 21 is a diagram illustrating a ladder program including a utilization example of image processing results according to Example 5.

In this way, a ladder program creator can read the signals of the signal region during machining and create such a ladder program that the nozzle dedicated for chip deposition portions is moved so that a cutting liquid contacts the chip deposition region of the work W, as illustrated in FIGS. 20A and 21. In this way, it is possible to cause the cutting liquid to contact the chips intensively to remove the chips and prevent malfunctioning of the machine or machining fault of the work W. Furthermore, since the ladder program is executed independently from the NC program, it is possible to remove chips in parallel with the machining by the NC program. In this way, it is possible to reduce the number of machining steps.

In the numerical control system 1B of the third embodiment, the same advantages as those of the numerical control system 1 of the first embodiment can be obtained. In the third embodiment, although an aspect in which the image processing input/output item-to-signal address conversion unit 14B is disposed in the numerical controller 10B has been illustrated, the image processing input/output item-to-signal address conversion unit 14B may be disposed in the image processing device 20.

Fourth Embodiment

In the first embodiment, the image processing input/output item-to-variable number conversion unit (the image processing input/output item-to-operation control information conversion unit) 14 converts the operation control information stored in the macro variable value table storage unit (the operation control information storage unit) 12 to image processing input items which are setting values of the format that can be recognized by the vision sensor 2 and the image processing device 20. In a fourth embodiment, the image processing input/output item-to-operation control information conversion unit converts commands that the program analysis unit reads from a program to image processing input items which are setting values of the format that can be recognized by the vision sensor and the image processing device.

Figure 22:
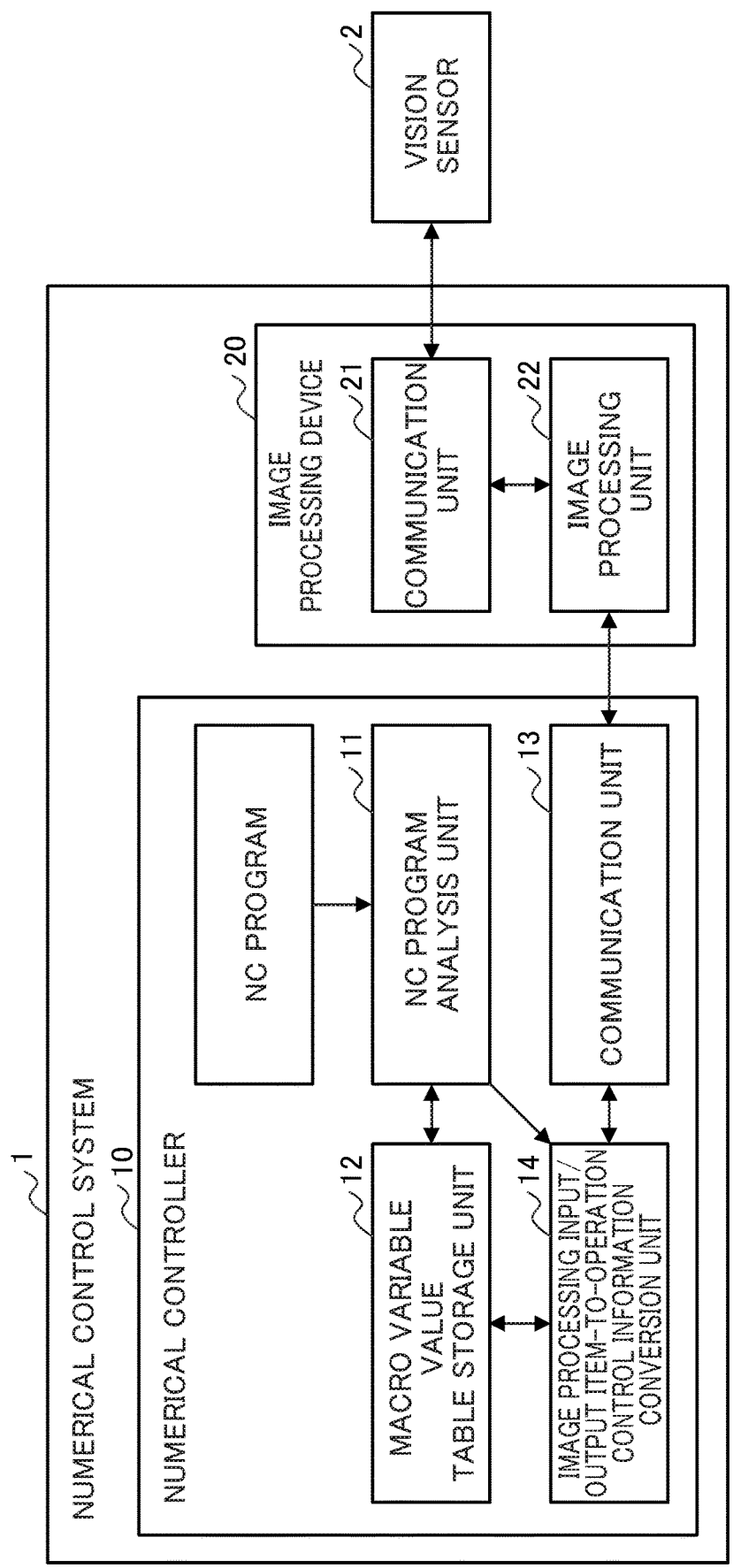
FIG. 22 is a diagram illustrating a numerical control system according to a fourth embodiment.

FIG. 22 is a diagram illustrating a numerical control system according to the fourth embodiment. The numerical control system 1 of the fourth embodiment illustrated in FIG. 22 is different from the numerical control system 1 of the first embodiment illustrated in FIG. 2 in that an image processing input/output item-to-operation control information conversion unit 14 is provided instead of the image processing input/output item-to-variable number conversion unit 14.

FIG. 23 is a diagram illustrating an example (the left part) and the description (the right part) of an NC program for controlling the vision sensor 2 and the image processing device 20 during imaging and image processing of the tool T or the work W. As illustrated in FIG. 23, in the present embodiment, a vision sensor number and an image processing program number are designated by the block of G810 instead of substituting the same in the macro variables #100 and #101.

The image processing input/output item-to-operation control information conversion unit 14 converts the activation command that the program analysis unit 11 reads from a program to image processing input items which are setting values of the format that can be recognized by the vision sensor 2 and the image processing device 20.

Figure 24:
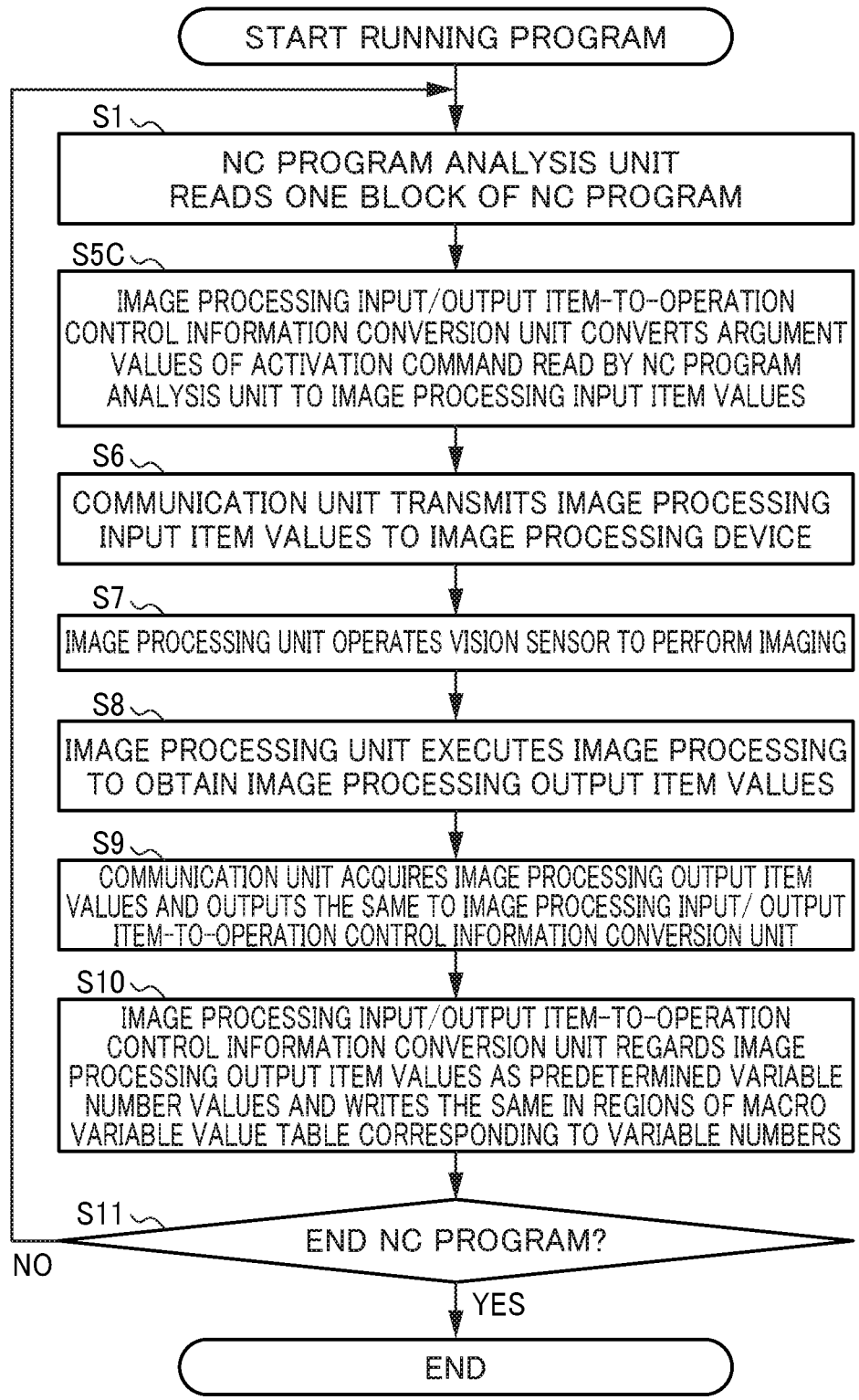
FIG. 24 is a flowchart illustrating an operation of imaging and image processing of a tool or a work by the numerical control system according to the fourth embodiment.

Next, an operation of imaging and image processing of the tool T or the work W by the numerical control system 1 according to the fourth embodiment will be described with reference to FIG. 24. FIG. 24 is a flowchart illustrating an operation of imaging and image processing of the tool T or the work W by the numerical control system 1 according to the fourth embodiment. First, as described above, the NC program analysis unit 11 of the numerical controller 10 reads one block of the NC program (S1) and analyzes a command content. Subsequently, the image processing input/output item-to-operation control information conversion unit 14 converts the values of the arguments of the imaging and image processing activation command read by the NC program analysis unit 11 to the values of image processing input items (S5C). Subsequently, as described above, the communication unit 13 transmits the image processing input item values acquired from the image processing input/output item-to-operation control information conversion unit 14 to the image processing device 20 (S6).

Subsequently, as described above, the image processing unit 22 of the image processing device 20 operates the vision sensor 2 via the communication unit 21 on the basis of the imaging and image processing activation command received from the numerical controller 10 and performs imaging of the tool T or the work W of the machine tool (S7). Subsequently, as described above, the image processing unit 22 executes image processing on the captured images from the vision sensor 2 and obtains the values of image processing output items corresponding to the values of image processing input items (S8).

Subsequently, as described above, the communication unit 13 of the numerical controller 10 acquires the values (execution results) of image processing output items from the image processing device 20 and outputs the same to the image processing input/output item-to-operation control information conversion unit 14 (S9). Subsequently, as described above, the image processing input/output item-to-operation control information conversion unit 14 regards the values of image processing output items acquired from the communication unit 13 as the values of predetermined variable numbers and writes the same in the region of the macro variable value table of the macro variable value table storage unit 12 corresponding to the variable numbers (S10).

Subsequently, as described above, the NC program analysis unit 11 determines whether analysis of all blocks of the NC program has ended (S11). When analysis of all blocks of the NC program has not ended, the flow returns to step S1 and the processes of steps S1 to S11 are performed for the next one block of the NC program. On the other hand, when analysis of all blocks of the NC program has ended in step S11, the numerical control system 1 ends the operation of imaging and image processing of the tool T or the work W.

In the numerical control system 1 of the fourth embodiment, the same advantages as those of the numerical control system 1 of the first embodiment can be obtained. Furthermore, according to the numerical control system 1 of the fourth embodiment, since the vision sensor 2 and the image processing can be activated without setting and reading data to the macro variable value table storage unit (the operation control information storage unit) 12, the processing time decreases. The numerical control system 1 of the fourth embodiment is effective when the number of types of image processing input items is small (when the expandability of the number of macro variables is not a merit). The features of the fourth embodiment may be applied to the second and third embodiments.

While embodiments of the present invention have been described, the present invention is not limited to the above-described embodiments, and various changes and modifications can be made. For example, in the above-described embodiments, a numerical control system that reflects the results of imaging and image processing of a tool or a work of a machine tool in an NC program or a ladder program has been illustrated. However, the features of the present invention are not limited thereto and can be applied to a numerical control system that reflects the results of imaging and image processing of a tool or a work of a machine tool in an executable macro program which is compiled and registered in a ROM (for example, a flash memory) or the like. Examples of such a macro program include P-CODE macros, which are one type of NC programs.

In the above-described embodiments, although an aspect in which a numerical controller controls a vision sensor via an image processing device has been described, the image processing device may control the vision sensor. FIG. 25 is a diagram illustrating an example (the left part) and the description (the right part) of an NC program for controlling the vision sensor 2 and the image processing device 20 during imaging and image processing of the tool T or the work W. As illustrated in FIG. 25, when an image processing device controls a vision sensor, the NC program may set only the setting values (the image processing program number #101 or the like) related to operation of the image processing device and the setting (the vision sensor number and the like) related to the vision sensor may be set in advance in the image processing device.

In the above-described embodiments, the numerical control system that controls a machine tool has been illustrated. However, the features of the present invention are not limited thereto and can be applied to a numerical control system that controls various machines such as an industrial machine or an industrial robot.

In the above-described embodiments, the vision sensor has been illustrated as an imaging device that images a tool or a work of a machine tool. However, the imaging device is not limited thereto, and various imaging devices may be used.

In the above-described embodiments, although an aspect in which the numerical controller and the image processing device are configured as different devices has been described, the numerical controller and the image processing device may be configured as one device. That is, the respective components of the numerical controller and the image processing device may be incorporated into one device. The roles of the respective components are the same as those described above. Moreover, in the above-described embodiments, although an aspect in which the image processing device and the imaging device are configured as different devices has been described, the image processing device and the imaging device may be configured as one device. That is, the respective components of the image processing device and the imaging device may be incorporated into one device. The roles of the respective components are the same as those described above.

EXPLANATION OF REFERENCE NUMERALS 1, 1B: Numerical control system
2: Vision sensor (Imaging device)
10, 10B: Numerical controller
11: NC program analysis unit (Program analysis unit)
11B: Ladder program analysis unit (Program analysis unit)
12: Macro variable value table storage unit (Operation control information storage unit)
12B: Signal storage unit (Operation control information storage unit)
13: Communication unit
14: Image processing input/output item-to-variable number conversion unit (Image processing input/output item-to-operation control information conversion unit)
14B: Image processing input/output item-to-signal address conversion unit (Image processing input/output item-to-operation control information conversion unit)
20: Image processing device
21: Communication unit
22: Image processing unit
T: Tool
W: Work

What is claimed is:

1. A numerical control system that controls a machine that performs predetermined processing on a work, comprising:
an image processing device that performs image processing on images of a tool or the work, the images of the tool or the work being captured by an imaging device; and
a numerical controller that controls the machine and controls the image processing device on a basis of a program,
wherein the numerical controller or the image processing device controls the imaging device,
wherein the numerical controller includes:
a program analysis unit that analyzes the program; and
an operation control information storage unit that stores operation control information necessary when controlling operations of the machine, the imaging device, and the image processing device in a format that can be read and written by the program analysis unit, and
wherein the numerical control system includes: an image processing input/output item-to-operation control information conversion unit that converts commands that the program analysis unit reads from the program or the operation control information stored in the operation control information storage unit to image processing input items which are setting values of a format that can be recognized by the imaging device and the image processing device and converts image processing output items which are results of image processing from the image processing device to operation control information of a format that can be recognized by the program analysis unit.

2. The numerical control system according to claim 1, wherein the operation control information storage unit is macro variables that can be read and written by the program analysis unit.

3. The numerical control system according to claim 1, wherein the image processing input/output item-to-operation control information conversion unit is disposed in the numerical controller.

4. The numerical control system according to claim 1, wherein the image processing input/output item-to-operation control information conversion unit is disposed in the image processing device.

* * * * *